(12) United States Patent
Hatano et al.

(10) Patent No.: US 8,094,824 B2
(45) Date of Patent: Jan. 10, 2012

(54) ENCRYPTING DEVICE, DECRYPTING DEVICE, INFORMATION SYSTEM, ENCRYPTING METHOD, DECRYPTING METHOD, AND PROGRAM

(75) Inventors: Yasuo Hatano, Yokohama (JP); Kunihiko Miyazaki, Yokohama (JP); Kenji Matsumoto, Yokohama (JP); Yoji Shimizu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1101 days.

(21) Appl. No.: 11/849,465

(22) Filed: Sep. 4, 2007

(65) Prior Publication Data
US 2008/0063191 A1 Mar. 13, 2008

(30) Foreign Application Priority Data
Sep. 4, 2006 (JP) .................................. 2006-238988

(51) Int. Cl.
*H04L 9/08* (2006.01)
(52) U.S. Cl. .............. 380/284; 380/44; 705/51; 726/27; 713/170
(58) Field of Classification Search ................ 705/51; 380/44, 284; 726/27; 713/170
See application file for complete search history.

(56) References Cited

U.S. PATENT DOCUMENTS
6,961,849 B1 11/2005 Davis et al.

FOREIGN PATENT DOCUMENTS
EP 1 503 267 2/2005
WO WO 03/049359 6/2003

OTHER PUBLICATIONS

Jun Anzai et al.; A Quick Group Key Distribution Scheme with Entity Revocation; Advances in Cryptology-ASIACRYPT'99; Lecture Notes in computer Science: vol. 1716 (LNCS 1716); pp. 333-347, Apringer-Verlag, 1999.
Nuttapong Attrapadung, et al.; Broadcast Encryption with Short Keys and Transmissions; Proceedings of the $3^{rd}$ ACM workshop on Digital rights management, pp. 55-66, 2003.

*Primary Examiner* — Michael Pyzocha
*Assistant Examiner* — Paul Callahan
(74) *Attorney, Agent, or Firm* — Antonelli, Terry, Stout & Kraus, LLP.

(57) ABSTRACT

An encryption processing part of a controller of each of user devices specifies components of content as encryption target parts, creates an encryption key creation key by reading out a public key, for each of the encryption target parts, of a second user who is allowed to view the encryption target part, raising a secret key of an administrator of the content data to the power of the public key thus read out, and calculating a remainder, encrypts random numbers each corresponding to each of the encryption target parts by using the encryption key creation key, creates an encryption key for each of the encryption target parts, and encrypts, by using the encryption key created for each of the encryption target parts, each of the encryption target parts corresponding to the encryption key.

13 Claims, 14 Drawing Sheets

ENCRYPTING DEVICE, DECRYPTING DEVICE, INFORMATION SYSTEM, ENCRYPTING METHOD, DECRYPTING METHOD, AND PROGRAM

INCORPORATION BY REFERENCE

This application claims priority based on a Japanese patent application, No. 2006-238988 filed on Sep. 4, 2006, the entire contents of which are incorporated herein by reference.

BACKGROUND OF THE INVENTION

The present invention relates to a technology of encrypting and decrypting content on a component basis.

In recent years, along with the developments of information communications equipment, various kinds of content have been digitally used. Those kinds of content may include information such as personal information, the viewing of which should be prohibited or restricted depending on users wishing to view the information. For example, if personal information is made public on the Internet, there may be a case where the personal information is abused by a user with malicious intent.

In view of the above, there has been conventionally known a method for protecting content by encrypting the content.

For example, according to the technologies disclosed in Jun Anzai, Natsume Matsuzaki, and Tsutomu Matsumoto, "A Quick Group Key Distribution Scheme with Entity Revocation", Advances in Cryptology-Asiacrypt'99, Lecture Notes in Computer Science: Vol. 1716 (LNCS1716), pp. 333-347, Springer-Verlag, 1999 (hereinafter referred to as Document 1) and in Nuttapong Attrapadung, Kazukuni Kobara and Hideki Imai, "Broadcast encryption with short keys and transmissions", Proceedings of the 3rd ACM workshop on Digital rights management, pp. 55-66, 2003 (hereinafter, referred to as Document 2), a method for distributing key information for decrypting encrypted content is devised so as to allow the content to be viewed only by a privileged user in a group.

SUMMARY OF THE INVENTION

According to the technologies described in Document 1 and Document 2, the entire content is encrypted as a unit, and therefore it is not possible to selectively allow the content to be partially disclosed to different users.

The present invention provides a technology for limiting, for each part of content, a user allowed to view the part of the content.

According to the present invention, an encryption key is created for each component included in content data by using a public key of a user allowed to view the component of the content data and a secret key of an administrator of the content data, and the content data is encrypted on a component basis by using the encryption key, to thereby create encrypted content.

For example, the present invention provides an encrypting device which encrypts content data, including: a storing part which stores a secret key of a first user, first public key information in which identification information for identifying each of the first user and a plurality of second users is associated with public keys of the first user and the plurality of second users identified by the identification information, and a coefficient shared by the secret key and the public keys; and a controlling part, in which the controlling part performs: an encryption target part specifying process of specifying, from among components which constitute the content data, at least one or more of the components as encryption target parts; a random number generating process of generating random numbers each corresponding to each of the encryption target parts; a user specifying process of creating, for each of the encryption target parts, user list information which specifies identification information for identifying, from among the plurality of second users, second users who are allowed to view the encryption target parts; an encryption key creation key creating process of creating an encryption key creation key, for each of the encryption target parts, by reading out a public key corresponding to the identification information for identifying each of the second users, from the first public key information, the identification information being specified in the user specifying process, raising the secret key of the first user to the power of the public key thus read out, and calculating a remainder by using the coefficient; an encryption key creating process of creating an encryption key for each of the encryption target parts by encrypting the random numbers each corresponding to each of the encryption target parts, by using the encryption key creation key; an encrypting process of creating, for each of the encryption target parts, an encrypted part obtained by encrypting a corresponding one of the encryption target parts by using the encryption key created in the encryption key creating process; and an encrypted content creating process of creating encrypted content which includes the encrypted parts, position information which specifies positions of the encryption target parts corresponding to the encrypted parts in the content data, the identification information for identifying the first user, the user list information for each of the encrypted parts, and information which specifies a random number for each of the encrypted parts.

As described above, according to the present invention, it is possible to limit, for each part included in content, a user allowed to view the part of the content.

These and other benefits are described throughout the present specification. A further understanding of the nature and advantages of the invention may be realized by reference to the remaining portions of the specification and the attached drawings.

DESCRIPTION OF THE EMBODIMENTS

Figure 1:
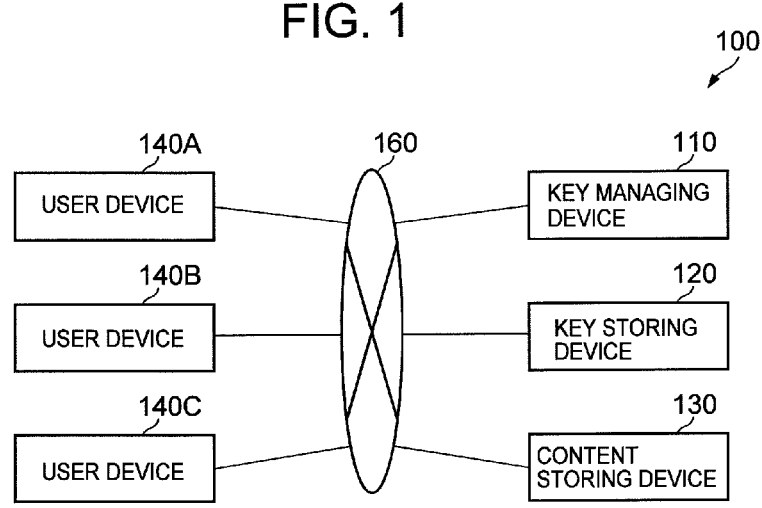
FIG. 1 is a schematic diagram of an information system according to a first embodiment of the present invention.

FIG. 1 is a schematic diagram of an information system 100 according to a first embodiment of the present invention.

As shown in the drawing, the information system 100 includes a key managing device 110, a key storing device 120, a content storing device 130, and user devices 140A to 140C, which are connected to one another through a network 160.

Figure 2:
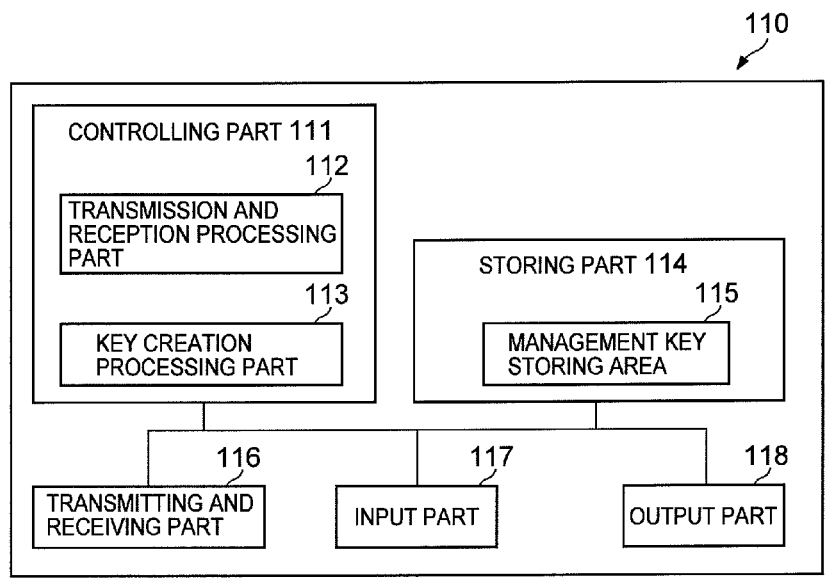
FIG. 2 is a schematic diagram of a key managing device.

The key managing device 110 includes, as shown in FIG. 2 (schematic diagram of the key managing device), a controlling part 111, a storing part 114, a transmitting and receiving part 116, an input part 117, and an output part 118.

The controlling part 111 includes, as shown in FIG. 2, a transmission and reception processing part 112 and a key creation processing part 113.

The transmission and reception processing part 112 controls transmission and reception of data through the transmitting and receiving part 116 described later.

The key creation processing unit 113 creates a management secret key for creating a secret key and a public key to be used by each of the user devices 140A to 140C described later, and stores the management secret key in a management key storing area 115 of the storing part 114 described later.

Also, the key creation processing part 113 creates secret keys to be used by the user devices 140A to 140C and pubic keys corresponding to the secret keys, in response to user registration requests made by the user devices 140A to 140C described later.

Then, the key creation processing part 113 transmits the secret keys to the user devices 140A to 140C from the transmitting and receiving part 116 described later through the transmission and reception processing part 112, and controls a process of transmitting the public keys to the key storing device 120 described later.

The user registration requests made by the user devices 140A to 140C described later each include a user ID for identifying a user, and a secret key and a public key are created for each user ID, and the user ID is attached to the public key to be transmitted to the key storing device 120.

The storing part 114 includes, as shown in FIG. 2, the management key storing area 115.

The management key storing area 115 stores a management secret key for creating secret keys and public keys to be used by the user devices 140A to 140C described later.

The transmitting and receiving part 116 is an interface which transmits and receives data through the network 160.

The input part 117 is a device for inputting data.

The output part 118 is a device for outputting data.

Figure 3:
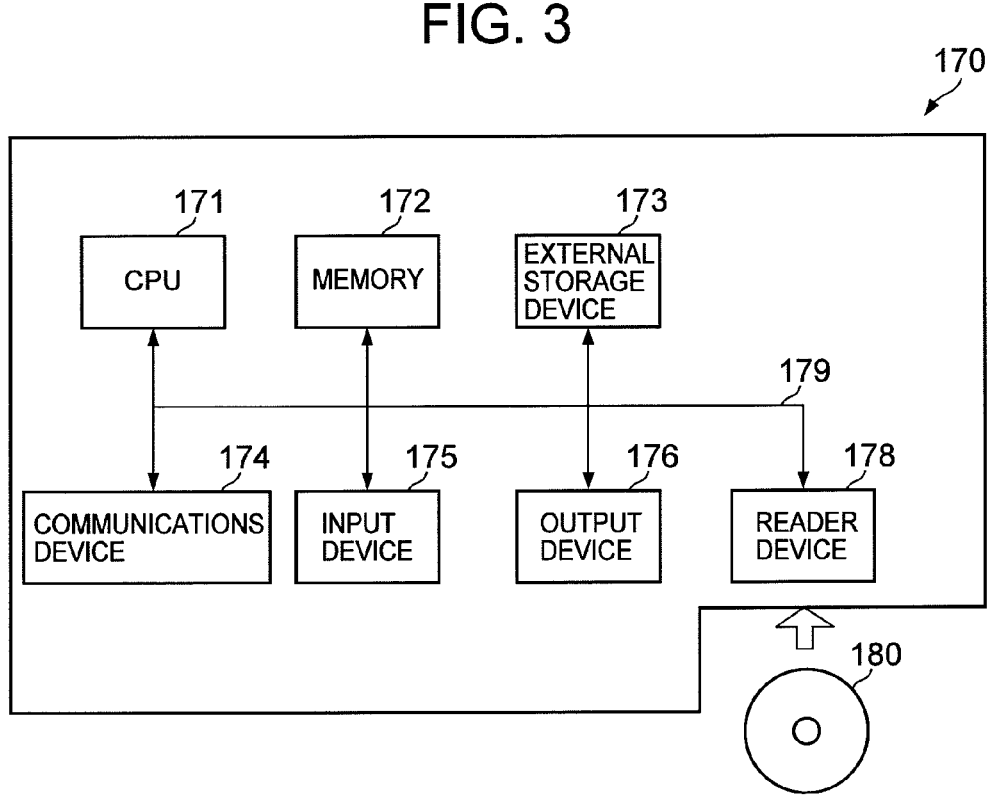
FIG. 3 is a schematic diagram of a computer.

The key managing device 110 configured as described above may be implemented by, for example, a computer 170 as shown in FIG. 3 (schematic diagram of a computer).

For example, the controlling part 111 and each processing part included therein may be implemented by executing a predetermined program stored in an external storage device 173 by a central processing unit (CPU) 171. The storing part 114 may be implemented by the external storage device 173 such as a hard disk. The transmission and receiving part 116 may be implemented by a communications device 174 such as a network interface card (NIC). The input part 117 may be implemented by an input device 175 such as a keyboard or a mouse. The output part 153 may be implemented by an output device 406 such as a reader device which reads data from an external storage medium including a magnetic disk, an optical disk, or a semiconductor memory.

Figure 4:
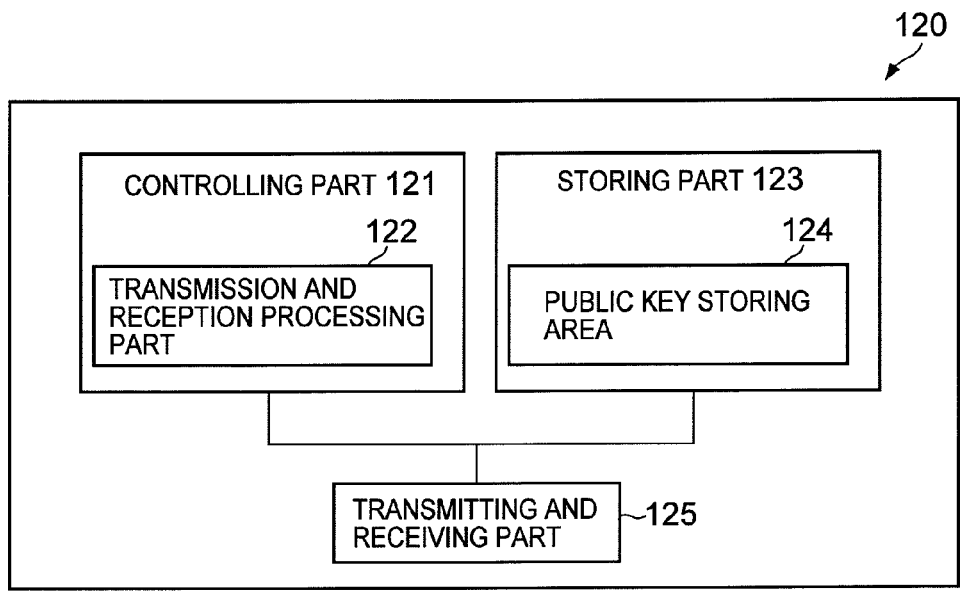
FIG. 4 is a schematic diagram of a key storing device.

FIG. 4 is a schematic diagram of the key storing device 120.

As shown in FIG. 4, the key storing device 120 includes a controlling part 121, a storing part 123, and a transmitting and receiving part 125.

The controlling part 121 includes, as shown in FIG. 4, a transmission and reception processing part 122.

The transmission and reception processing part 122 controls transmission and reception of data through the transmitting and receiving part 125 described later.

The storing part 123 includes, as shown in FIG. 4, a public key storing area 124.

Figure 5:
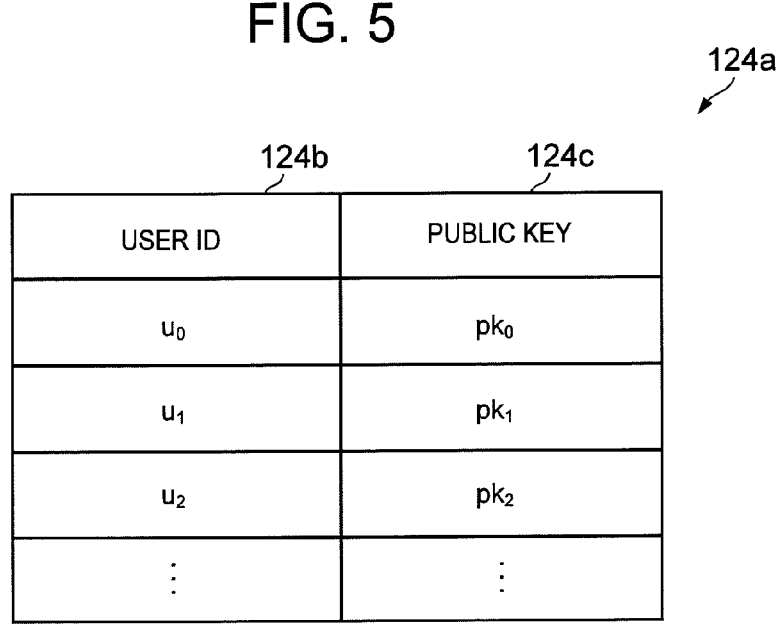
FIG. 5 is a schematic diagram of a pubic key table.

The public key storing area 124 stores a public key received from the key managing device 110 and information for specifying a user, the public key and the information being associated with each other. For example, in this embodiment, the public key storing area 124 stores a public key table 124a as shown in FIG. 5 (schematic diagram of a public key table).

The public key table 124a is provided with a user ID field 124b and a public key field 124c.

In the user ID field 124b, a user ID is registered as information for specifying a user.

In the public key field 124c, a public key of a user specified by the user ID in the user ID field 124b is registered.

The transmitting and receiving part 125 is an interface for transmitting and receiving data through the network 160.

The key storing device 120 configured as described above may also be implemented by, for example, the computer 170 shown in FIG. 3.

For example, the controlling part 121 and each processing part included therein may be implemented by executing a predetermined program stored in the external storage device 173 by the CPU 171. The storing part 123 may be implemented by the external storage device 173 such as a hard disk. The transmission and receiving part 125 may be implemented by the communications device 174 such as an NIC.

Figure 6:
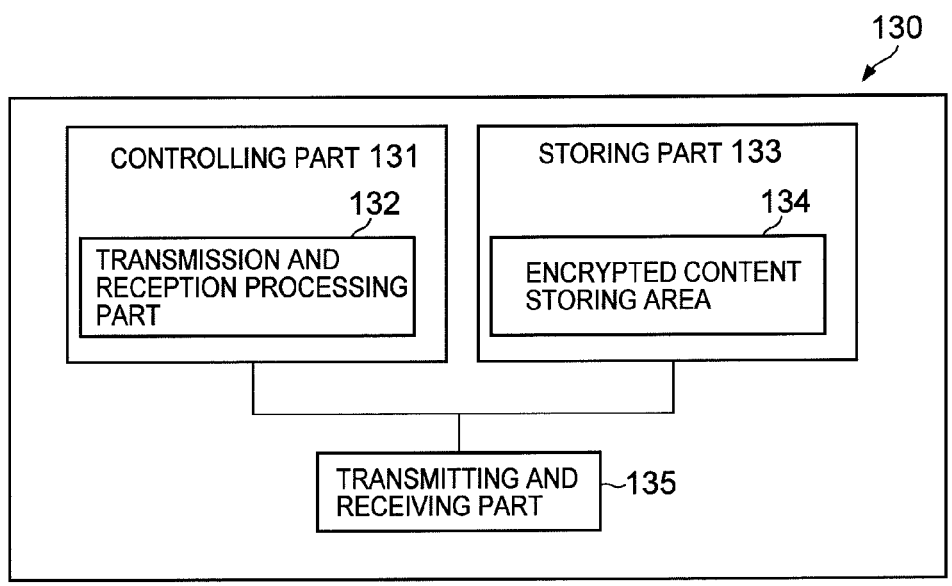
FIG. 6 is a schematic diagram of a content storing device.

FIG. 6 is a schematic diagram of the content storing device 130.

As shown in FIG. 6, the content storing device 130 includes a controlling part 131, a storing part 133, a transmitting and receiving part 135.

The controlling part 131 includes, as shown in FIG. 6, a transmission and reception processing part 132.

The transmission and reception processing part 132 controls transmission and reception of data through the transmitting and receiving part 135 described later.

The storing part 133 includes, as shown in FIG. 6, an encrypted content storing area 134.

The encrypted content storing area 134 stores encrypted content received from the user devices 140A to 140C described later. A data configuration of the encrypted content is described later.

The transmitting and receiving part 135 is an interface for transmitting and receiving data through the network 160.

The key storing device 130 configured as described above may also be implemented by, for example, the computer 170 shown in FIG. 3.

For example, the controlling part 131 and each processing part included therein may be implemented by executing a predetermined program stored in the external storage device 173 by the CPU 171. The storing part 133 may be implemented by the external storage device 173 such as a hard disk. The transmission and receiving part 135 may be implemented by the communications device 174 such as an NIC.

Figure 7:
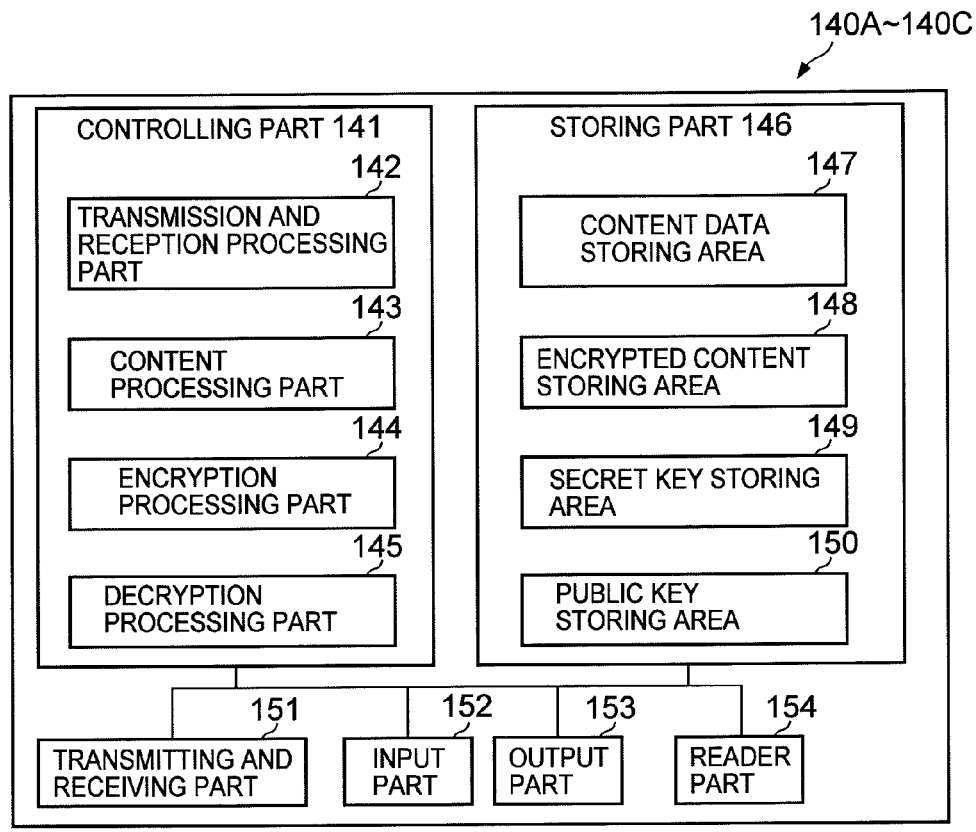
FIG. 7 is a schematic diagram of a user device.

The user devices 140A to 140C each include, as shown in FIG. 7 (schematic diagram of a user device), a controlling part 141, a storing part 146, a transmitting and receiving part 151, an input part 152, an output part 153, and a reader part 154.

The controlling part 141 includes, as shown in FIG. 7, a transmission and reception processing part 142, a content processing part 143, an encryption processing part 144, and a decryption processing part 145.

The transmission and reception processing part 142 controls transmission and reception of data through the transmitting and receiving part 151 described later.

In particular, according to this embodiment, the transmission and reception processing part 142 controls a process of creating a user registration request to be transmitted to the key managing device 110 and transmitting the user registration request to the key managing device 110 through the transmitting and receiving part 151 described later, a process of creating an encrypted content registration request to be transmitted with respect to the content storing device 130 and transmitting the encrypted content registration request to the content storing device 130 through the transmitting and receiving part 151 described later, and further a process of creating an encrypted content transmission request to be transmitted with respect to the content storing device 130 and transmitting the encrypted content transmission request to the content storing device 130 through the transmitting and receiving part 151 described later.

The transmission and reception processing part 142 also controls a process of storing the secret key received from the key managing device 110, in a secret key storing area 149 described later, a process of storing the public key received from the key storing device 120, in a public key storing area 150 described later, and a process of storing the encrypted content received from the content storing device 130, in an encrypted content storing area 148 described later.

The content processing part 143 accepts a data input from a user of each of the user devices 140A to 140C through the input part 152 described later and creates content data, or reads content data through the reader part 154 described later and stores the content data in a content data storing area 147 described later.

Upon receiving an encryption instruction specifying content data to be encrypted, from a user of one of the user device 140A to 140C through the input part 152 described later, the encryption processing part 144 encrypts the specified content data, to thereby create encrypted content. A process of creating encrypted content is described later with reference to FIG. 11.

Upon receiving the encrypted content from the content storing device 148, the decryption processing part 145 decrypts the encrypted content thus received, to thereby create content data. A process of decrypting content data is described later with reference to FIG. 15.

The storing part 146 includes, as shown in FIG. 7, the content data storing area 147, the encrypted content storing area 148, the secret key storing area 149, and the public key storing area 150.

The content data storing area 147 stores the content data created in the content processing part 143 based on the data input through the input part 152 or the content data read by the content processing part 143 through the reader part 154.

The encrypted content storing area 148 stores the encrypted content created in the encryption processing part 144.

The secret key storing area 149 stores a secret key of a specific user, which has been created in the key managing device 110.

The public key storing area 150 stores public keys of users received from the key storing device 120 and information for specifying each of the users (owners) of the public keys in association with each other.

For example, the public key storing area 150 may store a table similar to the public key table 124a shown in FIG. 5, which is provided with a user ID field 124b and a public key field 124c, so that the public key storing area 150 can store the user IDs and public keys corresponding to the user IDs.

The transmitting and receiving part 151 is an interface for transmitting and receiving data through the network 160.

The input part 152 is a device for inputting data.

The output part 153 is a device for outputting data. The output part 153, for example, displays content data decrypted in the decryption processing part 145.

The reader part 154 is a device for reading data from an external storage medium such as a magnetic disk, an optical disk, or a semiconductor memory.

Each of the user devices 140A to 140C configured as described above may also be configured by the computer 170 shown in FIG. 3.

For example, the controlling part 141 and each processing part included therein may be implemented by executing a predetermined program stored in the external storage device 173 by the CPU 171. The storing part 146 may be implemented by the external storage device 173 such as a hard disk. The transmission and receiving part 151 may be implemented by the communications device 174 such as an NIC. The input part 152 may be implemented by the input device 175 such as a keyboard or a mouse. The output part 153 may be implemented by an output device 176 such as a display. The reader part 154 may be implemented by a reader device 178 which reads information from a storage medium 180 having portability such as a CD-ROM or a DVD-ROM.

Each program executed in each of the devices may be stored in the external storage device 173 in the computer 170 in advance, or may be introduced as necessary from a removable external storage medium which can be used by the computer 170 or from another device through a communications medium (such as the network 160 or a carrier wave or a digital signal which is passed on through the network 160 or the like).

Hereinbelow, a description is given of a flow of data in the information system 100 of this embodiment.

Figure 8:
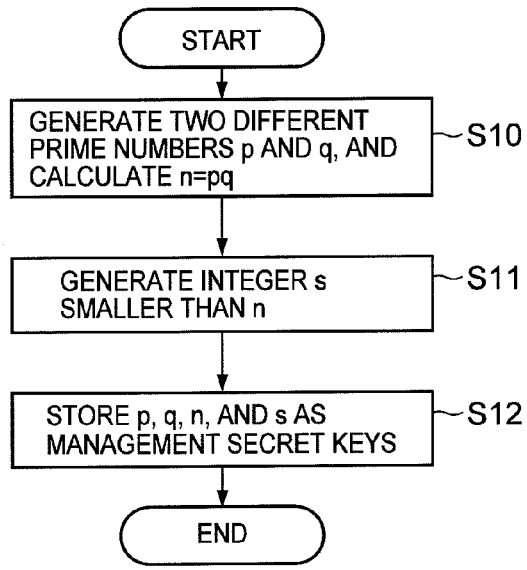
FIG. 8 is a flowchart illustrating a process of creating a management secret key.

FIG. 8 is a flowchart illustrating a process of creating a management secret key in the key managing device 110.

The process of creating a management secret key in the key managing device 110 is started, for example, in response to an instruction to create a management secret key, the instruction being input by an operator of the key managing device 110 through the input part 117.

First, the key creation processing part 113 of the key managing device 110 generates two different prime numbers p and q, and calculates n=pq (S10).

Next, the key creation processing part 113 generates an integer s which is smaller than n obtained in Step S10 (S11).

Then, the key creation processing part 113 stores p, q, n, and s generated as described above in the management key storing area 115 as a management secret key (S12).

In the above description, the coefficient n (=pq) is included as part of the management secret key. However, the coefficient n may include public information, and therefore may not necessarily be included in the management secret key. For example, the coefficient n may be stored and disclosed by the key storing device 120 as public information to be shared in the information system 100.

Also, in the following description, in a case where the coefficient n (=pq) includes public information similarly to the above, the coefficient n may not necessarily be included in secret information of a user.

On the other hand, it is desirable to securely store p, q, and s, because, once p, q, and s are leaked out, a secret key of a user can easily be calculated from a public key.

Figure 9:
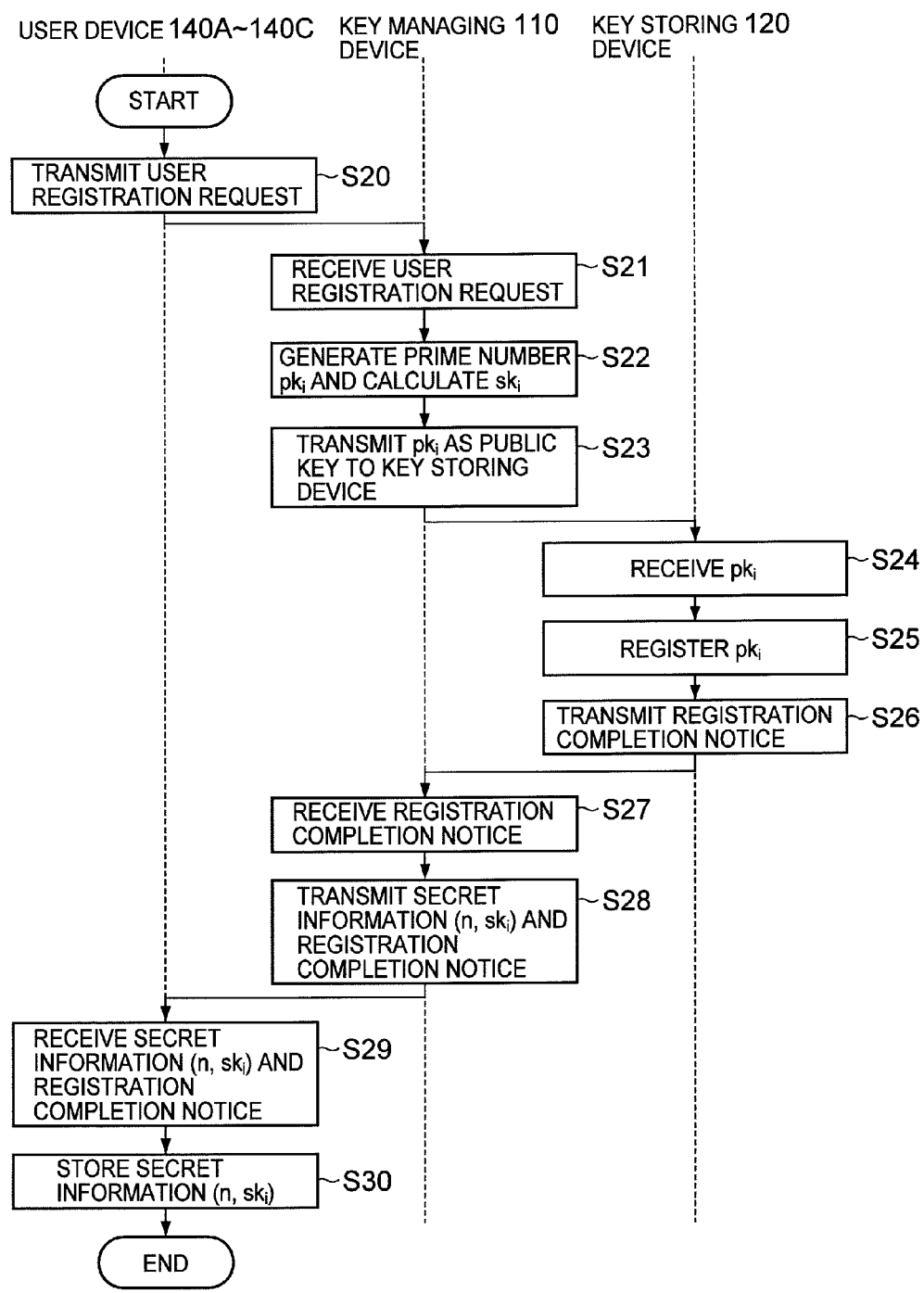
FIG. 9 is a flowchart illustrating a process of creating a secret key and a public key corresponding to the secret key.

FIG. 9 is a flowchart illustrating a process of creating a secret key to be used by any one of the user devices 140A to 140C and a public key corresponding to the secret key.

In this process, a user making registration in this flowchart is defined as a user i (with a user ID of $u_i$).

First, one of the users of the user devices 140A to 140C transmits a user registration request, through one of the user devices 140A to 140C, to the key managing device 110 (S20). In this case, the user registration request includes the user ID ($u_i$) for identifying the user i.

The transmission of the user registration request in Step S20 may be implemented by, for example, a method of transmitting e-mail to the key managing device 110, or by a method in which the key managing device 110 discloses a registration Web page to the user devices 140A to 140C, and the user i uses the registration Web page (by using HTTP) to transmit the user registration request from one of the user devices 140A to 140C to the key managing device 110. Also, a secret key storage completion notice and a public key registration completion notice may also be transmitted similarly through e-mail, HTTP, or the like.

When the key managing device 110 receives the user registration request from one of the user devices 140A to 140C through the transmitting and receiving part 116 (S21), the transmission and reception processing part 112 provides a key creation instruction to the key creation processing part 113, and the key creation processing part 113 generates prime number $pk_i$ smaller than $\phi$ (n) and calculates the following expression (1), to thereby create $sk_i$ (S22).

$$sk_i = s^{pk_i} \bmod n \qquad (1)$$

In Step S22, the function $\phi$ is the Euler's function, which is for outputting, with respect to a positive integer a, the number of positive integers from 1 to a which are coprime to a. Also, in Step S22, since n=pq, $\phi$(n) can be calculated as $\phi$(n) (p−1)(q−1) based on the definition of the Euler's function.

The transmission and reception processing part 112 transmits $pk_i$ created in Step S22 as a public key, together with $u_i$ which is the user ID of the user i, to the key storing device 120 through the transmitting and receiving part 116 (S23).

When the transmission and reception processing part 122 of the key storing device 120 receives the public key $pk_i$ together with the $u_i$ which is the user ID through the transmitting and receiving part 125 (S24), the transmission and reception processing part 122 creates an additional row in the public key table 124a stored in the public key storing area 124, and registers the user ID ($u_i$) and the public key $pk_i$ in the additional row created in the public key table 124a (S25).

Also, the key storing device 120 may disclose the public key $pk_i$ registered in Step S25 on, for example, a Web page, such that the public key $pk_i$ can be used by the users of the user devices 140A to 140C.

Then, after the registration of the user ID ($u_i$) and the public key $pk_i$ has been completed, the transmission and reception processing part 122 of the key storing device 120 transmits a registration completion notice to the key managing device 110 through the transmitting and receiving part 125 (S26).

When the transmission and reception processing part 112 of the key managing device 110 receives the registration completion notice from the key storing device 120 through the transmitting and receiving part 116 (S27), the transmission and reception processing part 112 transmits the secret key $sk_i$ of the user i created in Step S22 and the coefficient n as secret information (n, $sk_i$), together with the registration completion notice, to one of the 140A to 140C which has transmitted the user registration request in Step S20 (S28).

In transmitting the secret information (n, $sk_i$) to the one of the user devices 140A to 140C in Step S28, it is desirable to transmit the secret information (n, $sk_i$) through encrypted communications in order to prevent the secret information from being leaked out to a third party.

When the one of the user devices 140A to 140C receives the secret information (n, $sk_i$) and the user registration completion notice from the key managing device 110 through the transmitting and receiving part 151 (S29), the transmission and reception processing part 142 stores the secret information (n, $sk_i$) in the secret key storing area 149 (S30).

It is desirable to manage the secret information (n, $sk_i$) in each of the user devices 140A to 140C by storing the secret information (n, $sk_i$) in a tamper-resistant device such as an IC card in view of security.

In the above-mentioned process flow, the coefficient n is included as part of the secret information of the user. However, the coefficient n may not necessarily be included in the secret information, and may be included as part of the public information together with the public key. In this case, it is desirable to transmit the coefficient n to the key storing device 120 to be disclosed as well as the public key.

In registering a user as described above, there may be a case where it may be desired to restrict the registration to privileged users to some degree, for example, for the purpose of excluding an unauthorized user making registration. In this case, for example, an invitation card from an existing user may be required to be attached to the user registration request.

In deleting the secret key $sk_i$ issued with respect to the user i and the public key $pk_i$ corresponding to the secret key $sk_i$, for example, the secret information of the user i (n, $sk_i$) may be deleted from the corresponding one of the user devices 140A to 140C and a user deletion request may be transmitted to the key managing device 110. The key managing device 110 which has received the user deletion request may transmit a deletion request for deleting the user i to the key storing device 120, and the key managing device 120 may delete the public key $pk_i$ of the user and transmit a user deletion completion notice corresponding to the deletion of the user i to the corresponding one of the user devices 140A to 140C through the key managing device 110.

In the above-mentioned deletion process, it is desirable, in view of security, that the key managing device 110 authenticate (verify) a user transmitting the user deletion request, in order to prevent a situation where a malicious user spoofing as another user deletes the other user without permission. Examples of a process to authenticate a user include a process in which the key managing device 110 stores correspondence between the user IDs ($u_i$) and the secret keys $sk_i$, a secret key $sk_i$ of a user i to be deleted is included in the user deletion request to be transmitted by one of the user devices 140A to 140C to the key managing device 110, and it is checked whether the secret key $sk_i$ included in the user deletion request matches the secret key $sk_i$ of the user i who has transmitted the user deletion request. In this process, it is desirable to securely transmit the user deletion request to the key managing device 110 through encryption communications or the like. The above-mentioned user authentication (verification) may also be performed by another method different from the above.

In the above-mentioned deletion process, the key managing device 110 may desirably issue, in deleting a key, a certificate revocation list (CRL), in order to make it clear that which one of the keys has been deleted.

A key of a user must be deleted as described above not only in case where a user withdraws from a community but also a case where a secret key $sk_i$ of a user i has been leaked out. In a case where a key has been leaked out, it is desirable that the key managing device 110 immediately performs a process of deleting the key even if no request is made by the user, and notify the user of the deletion of the key.

Figure 10:
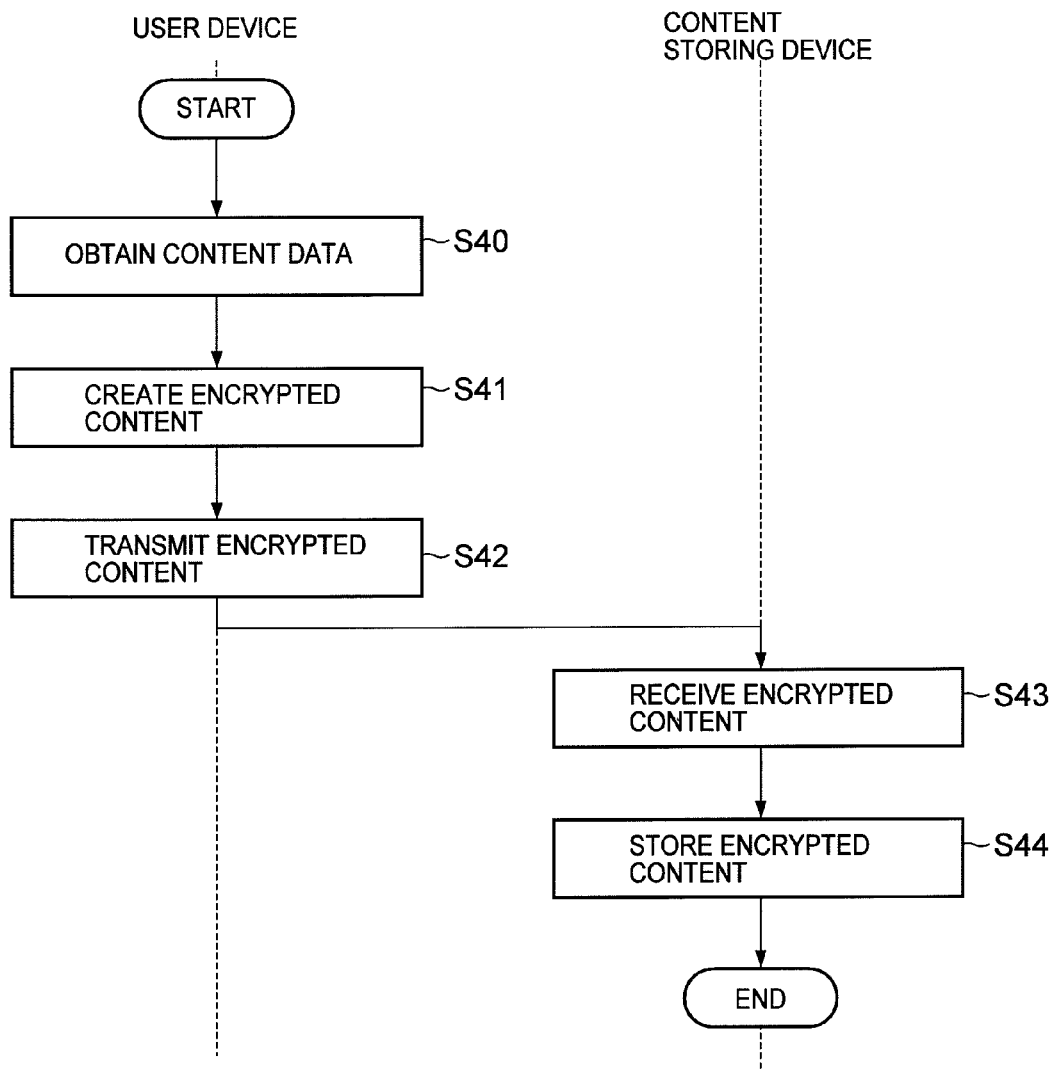
FIG. 10 is a flowchart illustrating a process of creating and registering encrypted content.

FIG. 10 is a flowchart illustrating a process of creating and registering encrypted content in the information system 100.

In the flowchart, it is assumed that the content data storing area 147 of each one of the user devices 140A to 140C has already stored content data created in the content processing part 143 and input through the input part 152 or content data read by the content processing part 143 through the reader part 154.

The process of creating and registering encrypted content is started in response to an instruction to create and register encrypted content, the instruction being input by a user of one of the user devices 140A to 140C through the input part 152.

First, the encryption processing part 144 of one of the user devices 140A to 140C, which has received the instruction of creating and registering encrypted content from the user, obtains content data to be encrypted from the content data storing area 147 (S40).

Then, the encryption processing part 144 encrypts the content data obtained in Step S40, to thereby create predetermined encrypted content (S41). A specific method which creates the encrypted content is described later with reference to FIG. 11.

The encrypted content thus created is transmitted to the content storing device 130 from the transmission and reception processing part 142 through the transmitting and receiving part 151 (S42).

The transmission and reception processing part 132 of the content storing device 130, which has received the encrypted content from one of the user devices 140A to 140C (S43), stores the encrypted content thus received in the encrypted content storing area 134 (S44).

Figure 11:
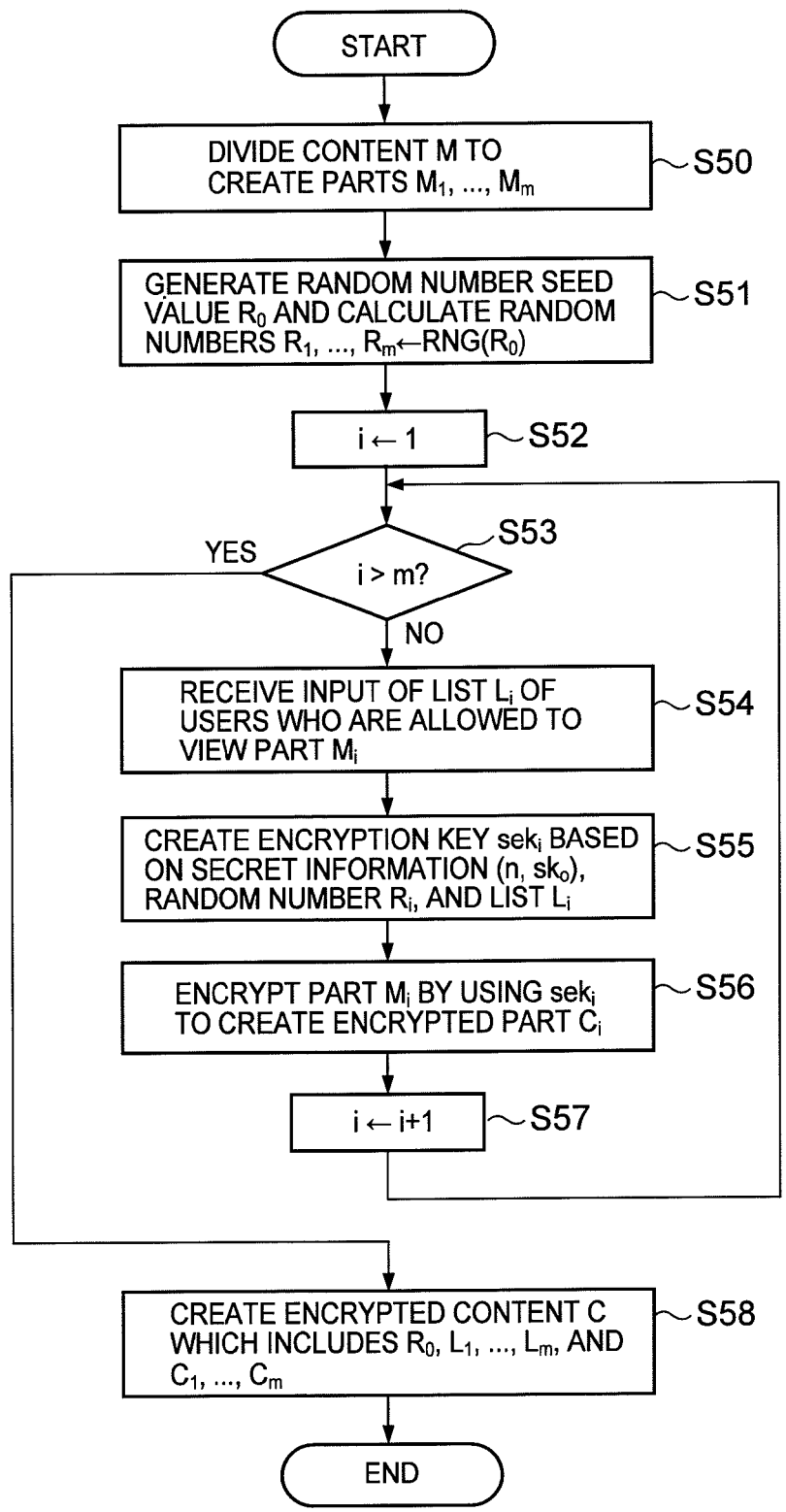
FIG. 11 is a flowchart illustrating a process of creating encrypted content.

FIG. 11 is a flowchart illustrating a process of creating encrypted content in the encryption processing part 144 of each of the user devices 140A to 140C. In the process, o is a natural number.

In the process, a user o encrypting content data has a user ID defined as $u_o$ and the secret information defined as $(n, sk_o)$.

First, in response to an instruction from a user input through the input part 152, the encryption processing part 144 divides the content data obtained from the content data storing area 147 into a plurality of components (S50). In this process, the content data which is to be divided into the plurality of components is referred to as content M, and the components obtained by dividing the content M are referred to as parts $M_1, \ldots, M_m$ (m is a natural number equal to or larger than 1).

In Step S50, the content M may be divided, for example, by using element units of an extensible markup language (XML) or by using units of column, row, or cell of a table.

Further, in Step S50, all the components of the content data may be subjected to the division to form the parts $M_1, \ldots,$ $M_m$, or only specific components may be extracted from the content data to form the parts $M_1, \ldots, M_m$, which are subjected to encryption.

Then, the encryption processing part 144 generates a random number seed value $R_0$ and calculates encryption key creation random numbers $R_1, \ldots, R_m$ by a known technique by using a random number generator (RNG) (S51).

For example, as regards the random number generator (RNG), there may be employed an arbitrary random generator such as a random number generator based on a linear congruential method or a random number generator using SAH-1 or DES.

Then, the encryption processing part 144 initializes an index i (i←1) which specifies one of the parts $(M_1, \ldots, M_m)$ (S52). In this case, the index i is a natural number.

Then, when the index i is larger than m (m corresponds to the number of parts into which the content is divided), the process proceeds to Step S58, otherwise the process proceeds to Step S54 (S53).

Next, the encryption processing part 144 receives, through the input part 152, an input of a list $L_i=(u_1, \ldots, u_k)$ of users who are allowed to view the part $M_i$ (S54). In this case, k is a natural number.

The list $L_i$ of users includes the user ID ($u_o$) of the user encrypting content data.

Then, the encryption processing part 144 creates an encryption key $sek_i$ based on the secret information $(n, sk_o)$ of the user $u_o$, the encryption key creation random numbers $R_i$, and the list $L_i$ (S55). In this case, o is a natural number as described above.

A specific method which creates the encryption key $sek_i$ is described later with reference to FIG. 16.

The encryption processing part 144 encrypts the part $M_i$ through symmetric-key cryptography by using the encryption key $sek_i$ created in Step S55, and creates an encrypted part $C_i$ (S56).

The encryption of the part $M_i$ through symmetric-key cryptography by using the encryption key $sek_i$ in Step S56 may be performed by carrying out an arbitrary symmetric key cryptography algorithm such as DES or AES of 128 bit key by using an arbitrary encryption usage mode such as CBC.

The encryption processing part 144 increments the index i by "1" (i←+1) (S57), and returns to Step S53 to repeat the process.

In Step S53, if the index i is larger than m, encrypted content C is created (S58). The encrypted content C includes the random number seed value $R_0$, the list $L_1, \ldots, L_m$ of users, and the encrypted parts $C_1, \ldots, C_m$, which are created in the above-mentioned flow.

The encrypted content C includes position information for each encrypted part $C_1, \ldots, C_m$. The position information is used for relating the encrypted parts $C_1, \ldots, C_m$ to the parts $M_1, \ldots, M_m$ when the parts $M_1, \ldots, M_m$ are decrypted.

In encrypting the part $M_i$ by using encryption key $sek_i$ in Step S56 described above, the part $M_i$ may not only be encrypted by the above-mentioned AES but also be attached with a message authentication code (MAC). In order to attach MAC to the part $M_i$, for example, the encryption key $sek_i$ is divided into two so as to allow the higher-order half thereof to be used as an encryption key in the symmetric-key cryptography technique and the lower-order half thereof to be used as a key for creating the MAC. By attaching the MAC to the part $M_i$, it is possible to confirm whether the part $M_i$ obtained by decrypting the encrypted part $C_i$ in the decryption processing part 145 correctly corresponds to the encrypted part $C_i$.

Alternatively, an entire result obtained by the above-mentioned encryption (encrypted content C) may be attached with a digital signature or a MAC. With the attachment of a digital signature or a MAC, it is possible to check whether the encrypted content stored in the content storing device 130 has been falsified or not. In attaching a digital signature, a signing key for creating the digital signature is necessary in addition to the secret key to be used for encryption. In attaching a MAC, the MAC is created by using an encryption key $sek_{MAC}$ which is created from a set of all the users who are allowed to view the content M (users capable of decrypting one or more parts $M_i$) and a secret key of a user requesting permission to view the content M (user creating encrypted content) by using the process in Step S55.

Further, in the above-mentioned process, the encryption key creation random numbers $R_1, \ldots, R_m$ are created based on the random number seed value $R_0$ by using the random number generator RNG, and the encryption key $sek_i$ is created by using the random numbers thus generated. However, the process is not limited thereto. For example, the generation of the encryption key creation random numbers in Step S51 may be skipped and the random number seed value $R_0$ may be used as the encryption key creation random number with respect to all the parts $M_1, \ldots, M_m$. Alternatively, the encryption key $sek_i$ may be created only from the secret key of the user $u_o$ and the list $L_i$ without using the encryption key creation random numbers, and the encryption key creation random numbers may be used as an initial value (initial value: IV) of the encryption usage mode to be used for encrypting the parts $M_1, \ldots, M_m$.

Figure 12:
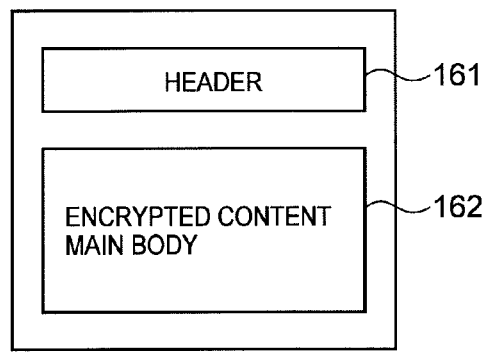
FIG. 12 is a schematic diagram of encrypted content.

The encrypted content C created in Step S58 may have a data configuration, for example, shown in FIG. 12 (schematic diagram of encrypted content).

As shown in FIG. 12, the encrypted content C is configured by including, for example, a header 161 and an encrypted content main body 162.

The header 161 includes information which specifies the random number seed value $R_0$ and information which specifies the user list $(L_1, \ldots, L_m)$ for specifying, for each encrypted part, a user who is allowed to view the part.

Figure 13:
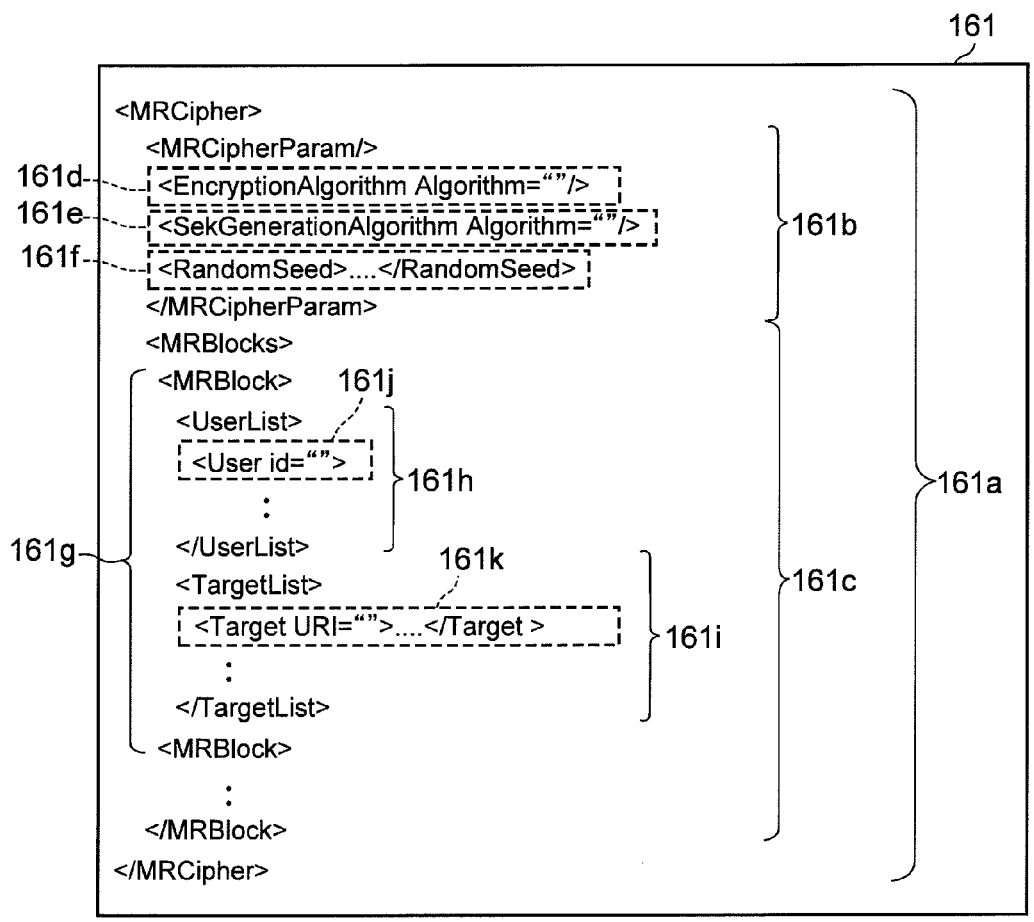
FIG. 13 is a schematic diagram of a header.

For example, the header 161 may be configured as XML data shown in FIG. 13 (schematic diagram of the header).

As shown in FIG. 13, the header 161 is illustrated as an MRCipher element 161a.

The MRCipher element 161a includes an MRCipherParam element 161b and an MRBlocks element 161c. The MRCipherParam element 161b stores information on a symmetric key cryptography algorithm used for the encryption, a random number generator used for generating random numbers, a random number seed value $R_0$, and the like, the information being common to all the parts $M_1, \ldots, M_m$. The MRBlocks element 161c stores information on the list $L_i$ of users capable of viewing each of the parts $M_1, \ldots, M_m$, storage sites of the parts $M_1, \ldots, M_m$, and the like, which is necessary for decrypting each of the encrypted parts $C_1, \ldots, C_m$.

The MRCipherParam element 161b is configured by including an EncryptionAlgorithm element 161d, a SekGenerationAlgorithm element 161e, and a RandomSeed element 161f.

The EncryptionAlgorithm element 161d is an encryption algorithm to be used for encrypting the part $M_i$. The SekGenerationAlgorithm element 161e is an element for describing an algorithm name of a random number generator to be used for generating the encryption key creation random numbers $R_1, \ldots, R_m$ from the random number seed value $R_0$. For example, in a case of encrypting the part $M_i$ by encrypting AES which is a 128 bit key on a CBC mode, the Algorithm attribute of the part $M_i$ may be described as "http://www.w3.org/2001/04/xmlenc#aes128-cbc". In the RandomSeed value element 161f, there may be described a value obtained by converting the random number seed value $R_0$ into a character string by using BASE64 encoding.

The MRBlocks element 161c includes an MRblock element 161g for storing information necessary for decrypting each part of the content.

The MRblock element 161g includes a UserList element 161h for storing the list $L_i$ of users allowed to view the part $M_i$ and a TargetList element 161i which indicates where the part $M_i$ is actually stored.

The UserList element 161h has a User element 161j as a child, and describes User IDs of the users allowed to view the part $M_i$ as the id attribute of the User element 161j, to thereby express the list $L_i$ of users capable of viewing the part $M_i$.

The TargetList element 161i has a Target element 161k as a child, and describes a URI or an XPath expression as the URI attribute in the Target element 161k, to thereby indicate the location of the part $M_i$.

Elements such as the EncryptionAlgorithm element 161d and the SekGenerationAlgorithm element 161e may be omitted in a case where the algorithm is unmistakable without being specified because a common algorithm is used in the entire information system 100 shown in FIG. 1. The elements name such as the MRCipher element 161a used in the above example is not limited thereto.

Further, in the above-mentioned example, an original format is used as an example of using the XML, however, another format such as an XML Encryption which is an encryption standard of the XML may also be used. The encrypted content C may not necessarily be realized by the XML.

Figure 14:
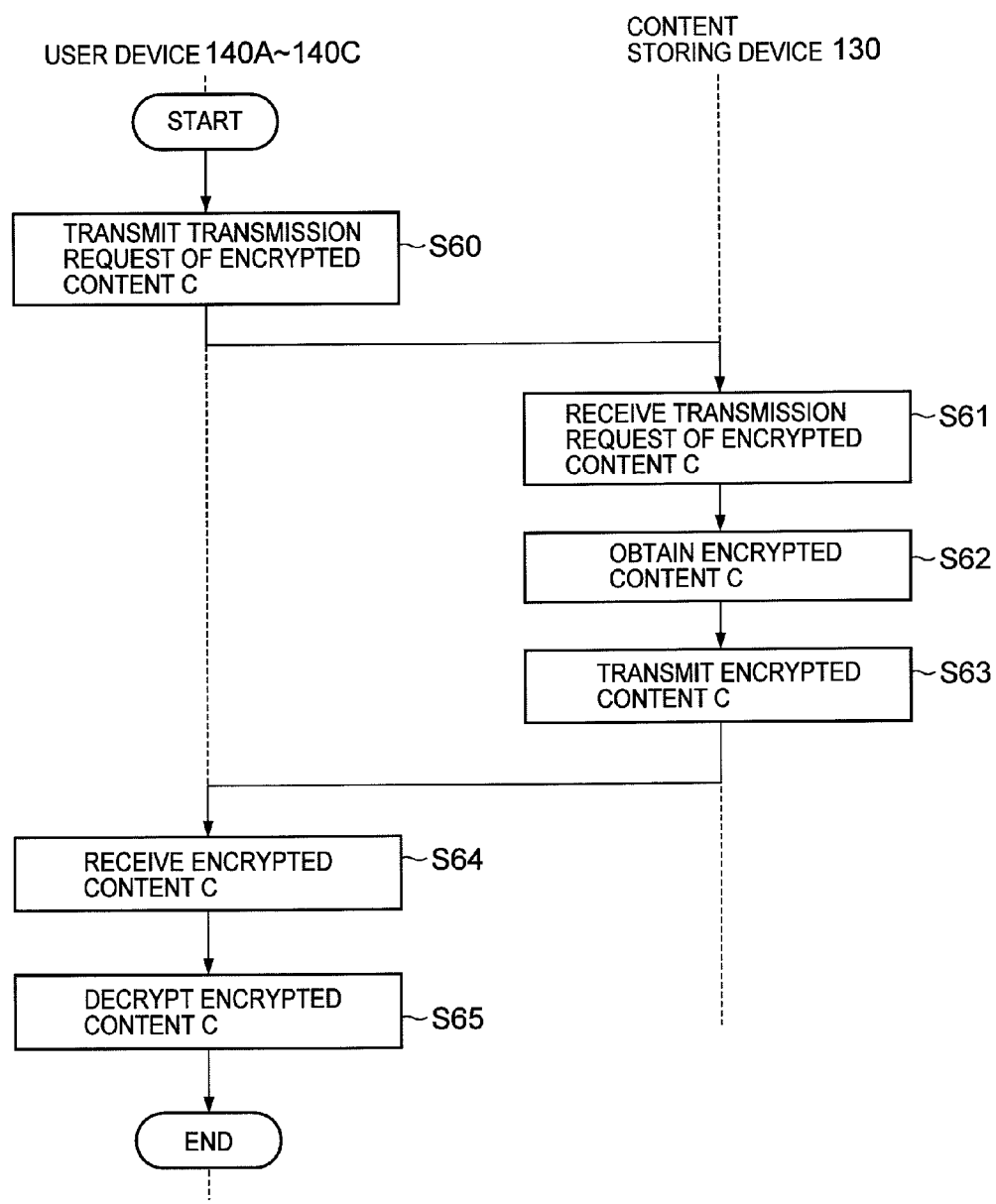
FIG. 14 is a flowchart illustrating a process of obtaining and decrypting encrypted content.

FIG. 14 is a flowchart illustrating a process of obtaining and decrypting encrypted content in the information system 100.

The process of obtaining and decrypting encrypted content in the information system 100 is started in response to an instruction to obtain the encrypted content, the instruction being input by one of the users of the user devices 140A to 140c with respect to the corresponding one of the user devices 140A to 140c through the input part 152 thereof.

First, the transmission and reception processing part 142 of one of the user devices 140A to 140C creates a transmission request of the encrypted content C and transmits the transmission request to the content storing device 130 (S60).

The content storing device 130, which has received the transmission request from any one of the user devices 140A to 140C (S61), obtains the encrypted content C which has been requested to be transmitted from the encrypted content storing area 134 (S62), and transmits the encrypted content C thus obtained to the corresponding one of the user devices 140A to 140C which has transmitted the transmission request (S63).

The one of the user devices 140A to 140C, which has received the encrypted content C from the content storing device 130 (S64), transmits the encrypted content C to the decryption processing part 145 from the transmission and reception processing part 142, decrypts the encrypted content C in the decryption processing part 145 (S65), and displays by the output part 153 an image of content data obtained by decrypting the encrypted content C. The decryption process is described later with reference to FIG. 15.

In displaying the image of the content data, regions which should not be viewed by the user are filled with black or the like.

Figure 15:
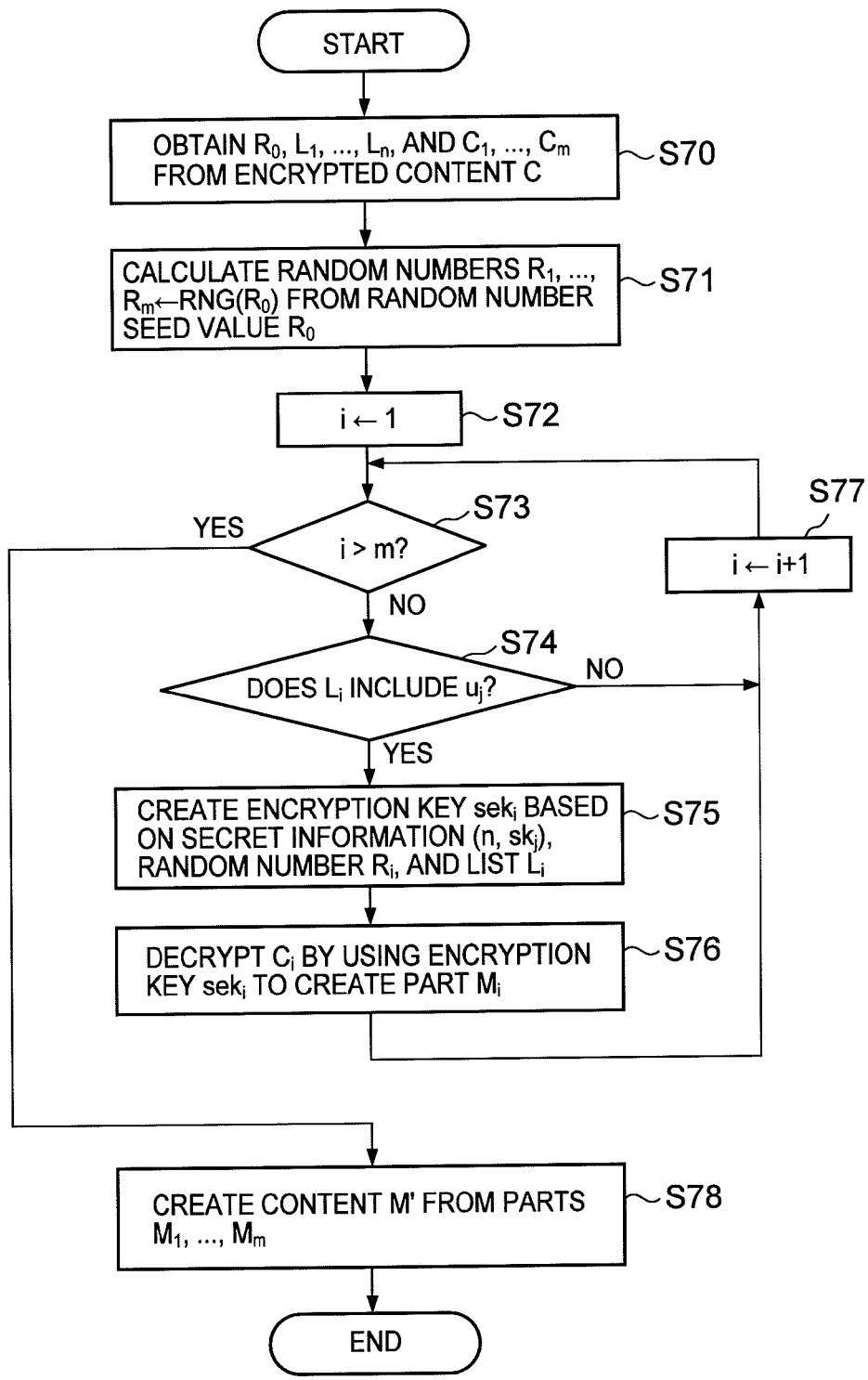
FIG. 15 is a flowchart illustrating a process of decrypting encrypted content.

FIG. 15 is a flowchart illustrating a process of decrypting the encrypted content in the decryption processing part 145 of each of the user devices 140A to 140C.

In the process, a user ID of a user j who has instructed the decryption processing of the encrypted content is defined as $u_j$, and the secret information of the user j is defined as (n, $sk_j$). In this case, j is a natural number.

First, the decryption processing part 145 obtains, from the encrypted content C, the random number seed value $R_0$, the user list $L_1, \ldots, L_m$, and the encrypted parts $C_1, C_m$ (S70).

Then, the decryption processing part 145 generates encryption key creation random numbers $R_1, \ldots, R_m$ from the random number seed value $R_0$ by using a random number generator RNG (S71).

The decryption processing part 145 initializes an index i of the encrypted parts $C_1, \ldots, C_m$ to be decrypted to "1" (i←1) (S72).

Next, the decryption processing part 145 proceeds to Step S78 if i>m (m corresponds to the number of the encrypted parts), otherwise proceeds to Step S74 (S73).

Next, the decryption processing part 145 refers to the list $L_i$ of users allowed to view the encrypted part $C_i$, and proceeds to Step S75 if the list $L_i$ includes the user ID ($u_j$) of the user j, otherwise proceeds to Step S77 (S74).

Next, the decryption processing part 145 creates an encryption key $sek_i$ based on the secret information (n, $sk_j$) of the user j, the encryption key creation random number $R_i$, and the list $L_i$ (S75). The process of creating the encryption key $sek_i$ in Step S75 is described later with reference to FIG. 16.

Then, the decryption processing part 145 decrypts the encrypted part $C_i$ by using the encryption key $sek_i$ created in Step S75 as the encryption key in the symmetric-key cryptography technique, to thereby create a part $M_i$ (S76).

Next, the decryption processing part 145 increments the index i of the encrypted part by "1" (i←i+1) (S77), and returns to Step S73 to repeat the process.

In the case where i>m in Step S73, the decrypted parts $M_1, \ldots, M_m$ are combined to create content data M' (S78).

Figure 16:
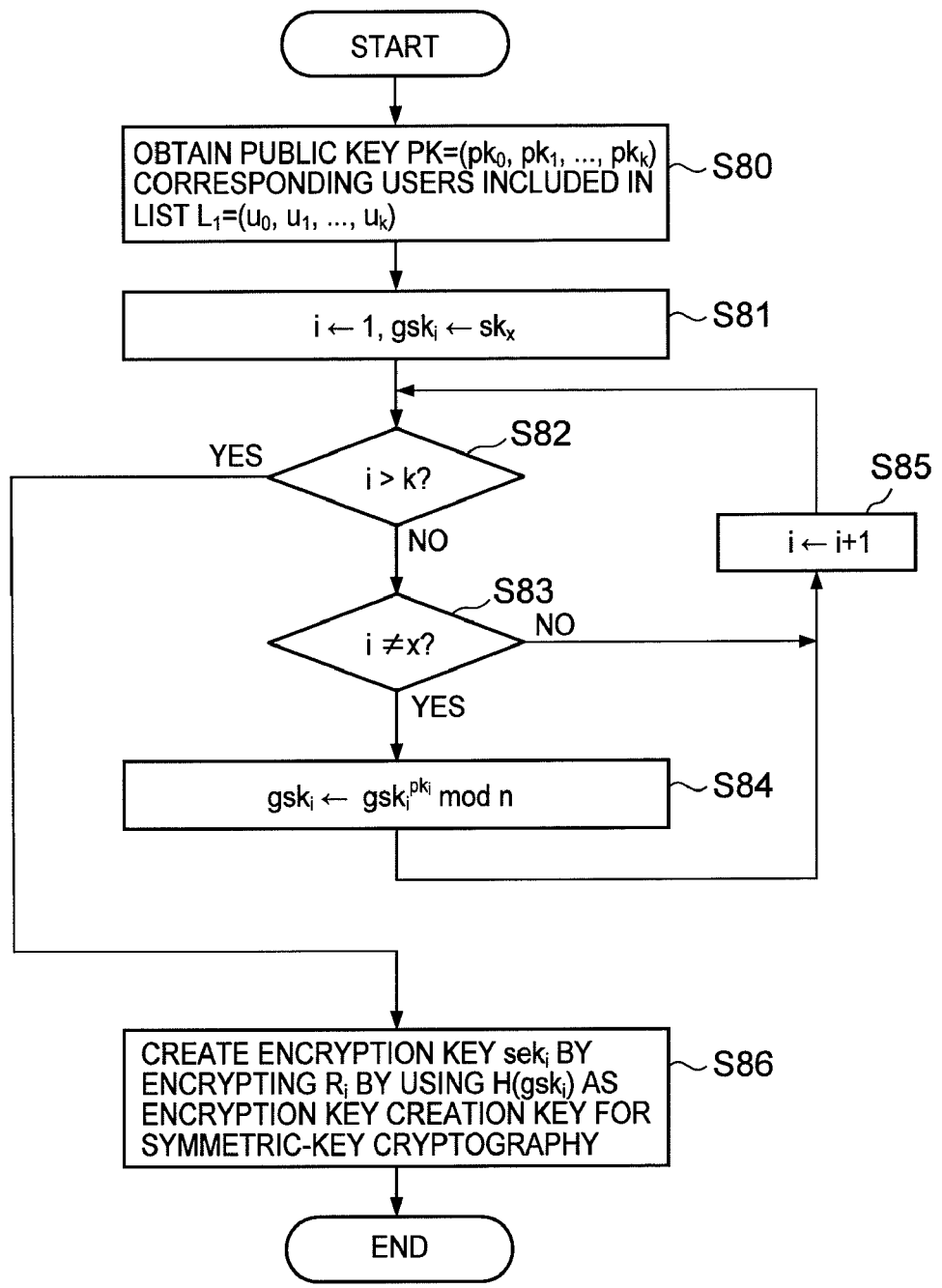
FIG. 16 is a flowchart illustrating a process of creating an encryption key (sek$_i$)

FIG. 16 is a flowchart illustrating a process of creating the encryption key $sek_i$ in Step S55 of FIG. 11 or in Step S75 of FIG. 15.

In this flowchart, the encryption processing part 144 or the decryption processing part 145 creates the encryption key $sek_i$ based on a user ID ($u_x$) of a user x, secret information (n, $sk_x$) of the user x, the user list $L_i$, and the encryption key creation random number $R_i$. In this case, x is a natural number.

First, the encryption processing part 144 or the decryption processing part 145 obtains a public key PK=($pk_1, \ldots, pk_k$) corresponding to the user IDs included in the user list $L_i$, from the public key storing area 150 (S80).

Then, the encryption processing part 144 or the decryption processing part 145 initializes an index i of the encrypted key $sek_i$ to "1" (i←1), and inputs the secret key $sk_x$ of the user x as an initial value for the encryption key creation key $gsk_i$ ($gsk_i \leftarrow sk_x$) (S81).

Next, the encryption processing part 144 or the decryption processing part 145 proceeds to Step S86 if i>k (k corresponds to the number of users registered in the user list $L_i$), otherwise proceeds to Step S83 (S82).

Then, the encryption processing part 144 or the decryption processing part 145 proceeds to Step S84 if i≠x, otherwise proceeds to Step S85 (S83).

In Step S84, the encryption processing part 144 or the decryption processing part 145 calculates an encryption key creation key $gsk_i'$ by using the following expression (2), and replaces the encryption key creation key $gsk_i$ with the encryption key creation key $gsk_i'$ thus created (S84).

$$gsk_i' = gsk^{pk_i} \bmod n \tag{2}$$

Then, the encryption processing part 144 or the decryption processing part 145 increments the index i by "1" (i←i+1) (S85), and returns to Step S82 to repeat the process.

In a case where i>k in Step S82, the encryption processing part 144 or the decryption processing part 145 calculates $h_i$=H ($gsk_i$) by using a hash function H, encrypts the encryption key creation random number $R_i$ by using $h_i$ as the creation key in the symmetric-key cryptography technique, to thereby obtain the encryption key $sek_i$ as a result of the encryption (S86).

As regards the hash function H, a known hash function such as SHA-1 or MD5 may be used. In creating the encryption key $sek_i$ from $h_i$, the above-mentioned symmetric key cryptography algorithm such as AES or DES may be used.

In the above-mentioned embodiment, $h_i$=H($gsk_i$) is calculated, and the encryption key creation random number $R_i$ is encrypted by using $h_i$ as the creation key in the symmetric-key cryptography technique, to thereby obtain the encryption key $sek_i$ as a result of the encryption. However, the present invention is not limited thereto. For example, the encryption key creation random number $R_i$ may be encrypted by using $gsk_i$, to thereby obtain the encryption key $sek_i$ as a result of the encryption.

Further, in Step S86, another process different from the above-mentioned process may also be performed. For example, $h_i$ may be created by taking out higher-order bits or lower-order bits of the created $gsk_i$, rather than by using the hash function H, and the higher-order bits or the lower-order bits thus taken out may be used as the encryption key in the symmetric-key cryptography technique which is used for creating the encryption key $sek_i$. Alternatively, the symmetric-key cryptography may not be used for creating the encryption key $sek_i$. Instead, an exclusive OR of $gsk_i$ and $R_i$ may be calculated to obtain the encryption key $sek_i$, and the result of the calculation may be obtained as the encryption key $sek_i$.

Through the above-mentioned processes, the encryption processing part 144 and the decryption processing part 145 can create the same encryption key $sek_i$ when information included in the list $L_i$ used by the encryption processing part 144 is the same with information included in the list $L_i$ used by the decryption processing part 145.

Specifically, in the encryption processing part 144, when a user ID of the user o (o is a specific natural number of 1 to k; k is a natural number) is defined as $u_o$ and the secret key of the user o is defined as $sk_o$, the encryption key $sek_i$ is created based on the following expression (3).

$$gsk_i = \left\{ \left( \ldots \left( (sk_o^{pk_1})^{pk_2} \right) \ldots \right)^{pk_k} \right\} \bmod n \tag{3}$$

In the expression, $sk_o$ is expressed by the following expression (4).

$$sk_o = s^{pk_o} \bmod n \tag{4}$$

Accordingly, the expression (3) is expressed as the following expression (5).

$$gsk_i = \{s^{(pk_0 \times pk_1 \times \ldots \times pk_k)}\} \bmod n \tag{5}$$

On the other hand, in the decryption processing part 145, when a user ID of the user j (j is a specific natural number of 1 to k; k is a natural number) is defined as $u_j$ and the secret key of the user j is defined as $sk_j$, the encryption key $sek_i$ is created based on the following expression (6).

$$gsk_i = \left\{ \left( \ldots \left( (sk_j^{pk_1})^{pk_2} \right) \ldots \right)^{pk_k} \right\} \bmod n \tag{6}$$

In this case, $sk_j$ is expressed by the following expression (7).

$$sk_j = s^{pk_j} \bmod n \quad (7)$$

Accordingly, the expression (6) is expressed as the following expression (8).

$$gsk_i = \{s^{(pk_0 \times pk_1 \times \cdots \times pk_k)}\} \bmod n \quad (8)$$

In other words, as shown by the expressions (5) and (8), the encryption key $sek_i$ created in the encryption processing part 144 and the encryption key $sek_i$ created in the decryption processing part 145 are equal to each other.

As described above, according to the information system 100 of this embodiment, it is possible to perform encryption for selectively disclosing content for each user and decryption corresponding thereto.

In the case of selectively disclosing content as described above, there may be a case where a plurality of content parts share users sharing information (users to whom information is disclosed). Examples of the above-mentioned case include a case where, when a plurality of communities exist in a social network, a disclosure destination of information is limited to users of a specific community.

In this case, it is inefficient to calculate the same encryption key creation key $gsk_i$ plurality of times in the encryption processing part 144 or in the decryption processing part 145 according to the flowchart shown in FIG. 16. One of the methods for solving this problem includes a method of calculating in advance the encryption key creation key $gsk_i$ which is often used, and storing the encryption key creation key $gsk_i$ in the storing part 146, to thereby omit the process. It is also possible to determine, among the plurality of users, the encryption key creation key $gsk_i$ to be calculated in advance such that the encryption key creation key $gsk_i$ calculated in advance can be regarded as a common key for the community.

According to a method in which the encryption key creation key $gsk_i$ is freely determined among users, the users agree on what type of users to exist in the community, which makes it difficult to keep track of the users in the community. Also, in a case where a certain user has withdrawn from the community, there arises a problem that the remaining users each have to calculate again the encryption key $gsk_i$ shared by the users.

To solve this problem, if the key managing device 110 is allowed to manage a public key corresponding to a community as described above, it is possible to easily perform, for example, formation of a community. Also, by using the public key for the community issued by the key managing device 110, it is possible to efficiently encrypt information to be disclosed to the community.

As an example of realizing the management of the public key by the key managing device 110, there may be a case where not only a secret key $sk_i$ and a public key $pk_i$ of an individual user are issued but also a secret key $sk_i$ is issued with respect to a group including a plurality of users. In this case, the process flow of issuing the secret key $sk_i$ and the public key $pk_i$ follows the above-mentioned process, but the secret key $sk_i$ thus created and the registration completion notice need to be transmitted to all the users belonging to the group.

In the above, a description is given of creation of a group key with respect to a community in a social network. However, the creation of a group key described above is not limited to a social network, and is also effective in a case where a group key is applied with respect to an organization structure in a company (e.g., a division or a section).

Figure 17:
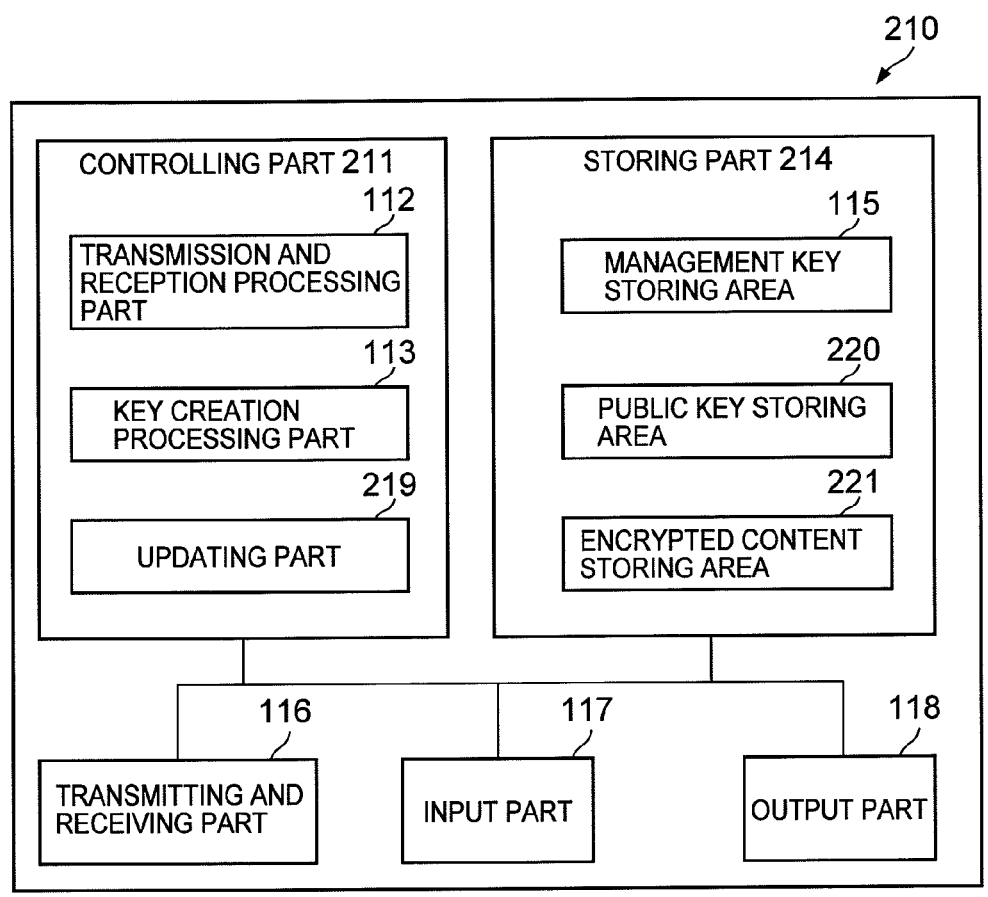
FIG. 17 is a schematic diagram of a key managing device (210) used in an information system according to a second embodiment of the present invention.

FIG. 17 is a schematic diagram of a key managing device 210 used in an information system according to a second embodiment of the present invention.

As shown in FIG. 17, as compared with the first embodiment, the key managing device 210 in this embodiment is similar to the first embodiment except in that a controlling part 211 is further provided with an updating part 219, and a storing part 214 is further provided with a public key storing area 220 and encrypted content storing area 221. Accordingly, in the following, those parts which are different from the first embodiment are described.

In this embodiment, similarly to the first embodiment, content data is encrypted to be provided to a user. In a case where a secret key of a certain user has leaked out, for example, there arises a risk that encrypted content C which has already been encrypted may be viewed by an unintended user who uses the secret key which has leaked out. In this case, it is necessary to take countermeasures. In the countermeasures, for example, a secret key and a public key of the user are re-issued while decrypting once the encrypted content C which has been created by using the secret key which has leaked out, and re-encrypting the encrypted content C.

However, in a case where a data size of the subject content data is large, it is inefficient to re-encrypt the encrypted content C.

In this regard, if it is possible to prevent the encrypted content C from being decrypted with the use of the key which has leaked out, by updating information in the above-mentioned header 161 (for example, the random number seed value $R_0$) in the encrypted content C, it is possible to reduce a load to be generated in relation to the updating of the encrypted content C when the secret key has leaked out.

In view of this, according to this embodiment, there is provided an information system capable of efficiently taking countermeasures against a case where a secret key which has been distributed to a user has leaked out.

In the following, a description is given of an exemplary case where the above-mentioned method is performed by the key managing device 210.

In this embodiment, in order to prevent the encrypted content C from being decrypted by a key which has leaked out, the updating part 219 additionally provided to the controlling part 211 stores the encrypted content C, which may be decrypted by using the key which has leaked out, in an encrypted content storing area 221 described later through the transmission and reception processing part 112, and controls a process of updating the header 161 of the encrypted content C thus stored. The process of updating the header 161 is described in detail later with reference to FIG. 18.

Also, in this embodiment, the public key storing area 220 additionally provided to the storing part 214 stores, in a case where a secret key and a public key of a user have been created in the key creation processing part 113 as shown in the flowchart of FIG. 9, the public keys of users and information for specifying a user (owner) of the corresponding public key, in association with each other.

For example, the public key storing area 220 also stores a table similar to the public key table 124a shown in FIG. 5 which includes the user ID field 124b and the public key field 124c, to thereby store user IDs and public keys corresponding to the user IDs.

In particular, according to this embodiment, in a case where a secret key of a certain user has leaked out, the secret key and the public key of the user are recreated by following the procedure similar to the flowchart shown in FIG. 9, to thereby update a public key to be registered in the public key field 124c of the public key table 124a.

Further, in this embodiment, the encrypted content storing area 221 additionally provided to the storing part 214 stores encrypted content C having the header 161 to be updated.

The transmission and reception processing part 112 in this embodiment also performs a process of receiving, in response to a request from the updating part 219, the encrypted content C from the content storing device 130 through the transmitting and receiving part 110, and a process of transmitting the encrypted content C with the updated header 161 to the content storing device 130.

Figure 18:
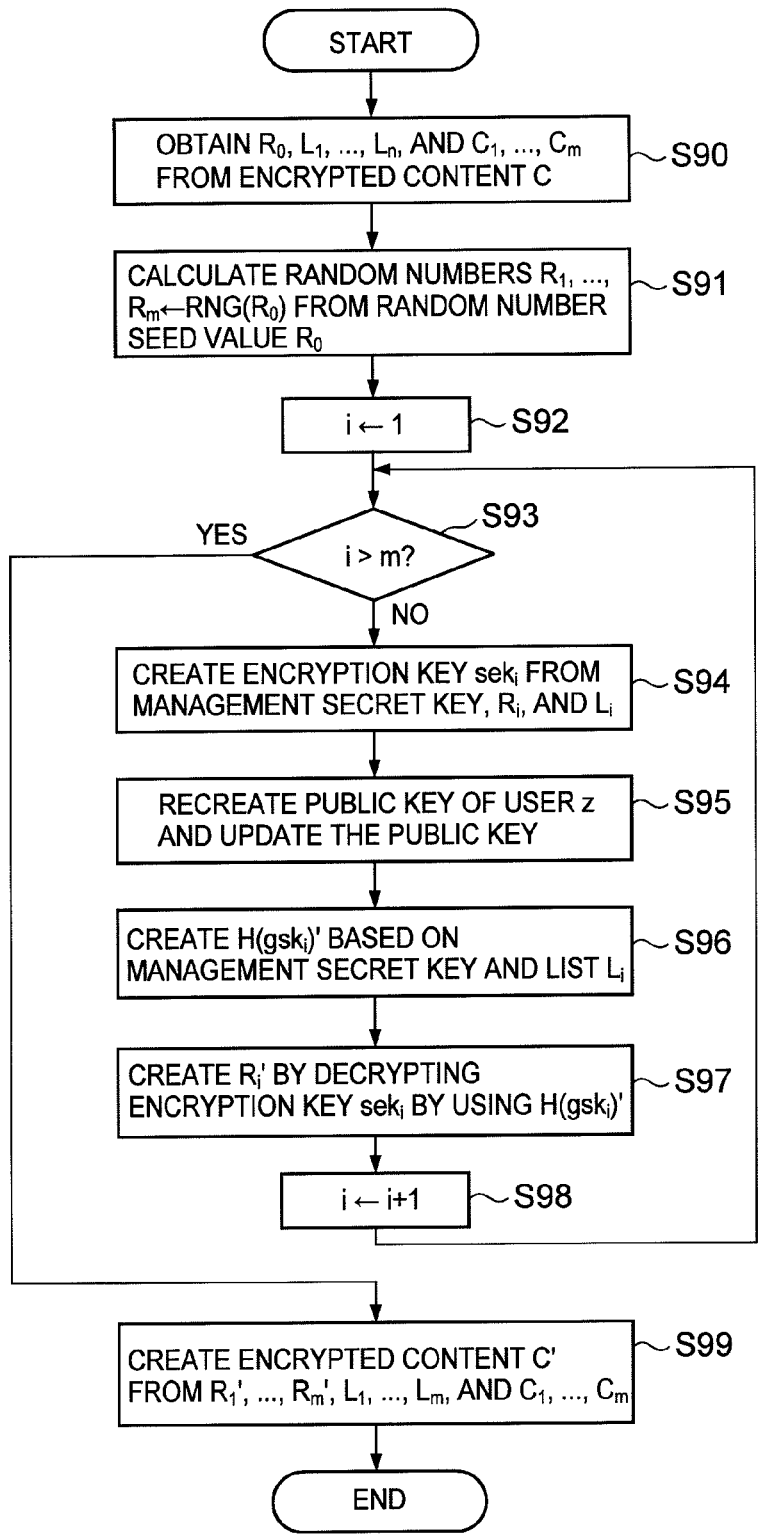
FIG. 18 is a flowchart illustrating an example of an updating process.

FIG. 18 is a flowchart illustrating an example of an update process to be performed by the updating part 219 of the key managing device 210.

This flowchart is started in response to an update instruction input by an operator of the key managing device 210 through the input part 117, the update instruction specifying the encrypted content C having header information to be updated. Upon receiving the update instruction, the transmission and reception processing part 112 of the key managing device 210 receives the specified encrypted content C from the content storing device 130, and stores the encrypted content C in the encrypted content storing area 148.

First, the updating part 219 reads out the encrypted content C from the encrypted content storing area 221 and obtains the random number seed value $R_0$, a list of users $L_1, \ldots, L_m$, and encrypted parts $C_1, \ldots, C_m$ from the encrypted content C (S90).

Next, the updating part 219 generates encryption key creation random numbers $R_1, \ldots, R_m$ from the random value seed value $R_0$ by using the random number generator RNG (S91).

Next, the updating part 219 initializes an index i of the encrypted parts to "1" (i←1) (S92), and proceeds to step S97 if i>m (m corresponds to the number of the encrypted parts), otherwise proceeds to step S93 (S92).

Then, the updating part 219 creates an encrypted key $sek_i$ based on a management secret key s, the encryption key creation random number $R_i$, and the list $L_i$ of users (S94). In this case, z is a natural number.

Also, the creation of the encryption key $sek_i$ in Step S94 may be performed by following the flowchart shown in FIG. 16. However, in Step S81, the initial value of the encryption key creation key $gsk_i$ may use s which is part of the management secret key stored in the management key storing area 115, and Step S84 may be performed by using all the public keys corresponding to the list $L_i$, without performing the process of Step S83.

Next, in the key creation processing part 113, a secret key and a public key of a user z are recreated, and replace the public key of the user z stored in the public key storing area 220 with the public key thus recreated, to thereby update the public key (S95).

Next, the updating part 219 creates a creation key H ($gsk_i$) based on the management secret key s and the list $L_i$ of users (S96), and decrypts the encryption key $sek_i$ created in Step S94 by the creation key H ($gsk_i$)' created in Step S96, to thereby create a new encryption key creation random number $R_i'$ (S97).

The creation of the creation key H ($gsk_i$) may be performed by following the flowchart shown in FIG. 16. However, the creation key H ($gsk_i$)' has a different value from the creation key H ($gsk_i$) calculated in the process of creating the secret key $sk_i$ in Step S94 with respect to a part for which the public key of the user z is used, because the public key of the user z who has a secret key leaked out is updated in Step S95.

Then, the updating part 219 increments the index i of the encrypted part by "1" (i←i+1) (S98), and returns to Step S93 to repeat the process.

If i>m in Step S93, encrypted content C' is created based on the newly-generated encryption key creation random numbers $R_1', \ldots, R_m'$, the list of users $L_1, \ldots, L_m$, and the encrypted parts $C_1, \ldots, C_m$ (S99). The encrypted content C' thus created is transmitted to the content storing device 130 through the transmission and reception processing part 112, and the content storing device 130 replaces the encrypted content C before updating with updated encrypted content C' to store the encrypted content C'.

Any one of the user devices 140A to 140C, which has received the encrypted content C' updated as described above, may perform decryption by using the encryption key creation random numbers $R_1', \ldots, R_m'$ included in the header 161, instead of generating encryption key creation random numbers from the random number seed value $R_0$.

In the second embodiment, the key managing device 210 updates the header 161. However, the present invention is not limited thereto. For example, an updating part which functions similarly to the updating part 219 may be provided to any one of the user devices 140A to 140C, so as to allow each of the user devices 140A to 140C to update the header 161 based on the secret key or the management secret key which has been used for creating the encrypted content C.

According to the flowchart of FIG. 18, in a case where the secret key of a user has leaked out, the encryption key creation random numbers $R_1', \ldots, R_m'$ are re-generated and attached, in place of the random number seed value $R_0$, to the encrypted content C' newly created. Accordingly, the encrypted content C' created in the above-mentioned process has the header 161 increased in size.

In view of this, a description is given of an example of a method of reducing the size of the header 161 of the re-created encrypted content C' by devising a method of generating encryption key creation random numbers.

Figure 19:
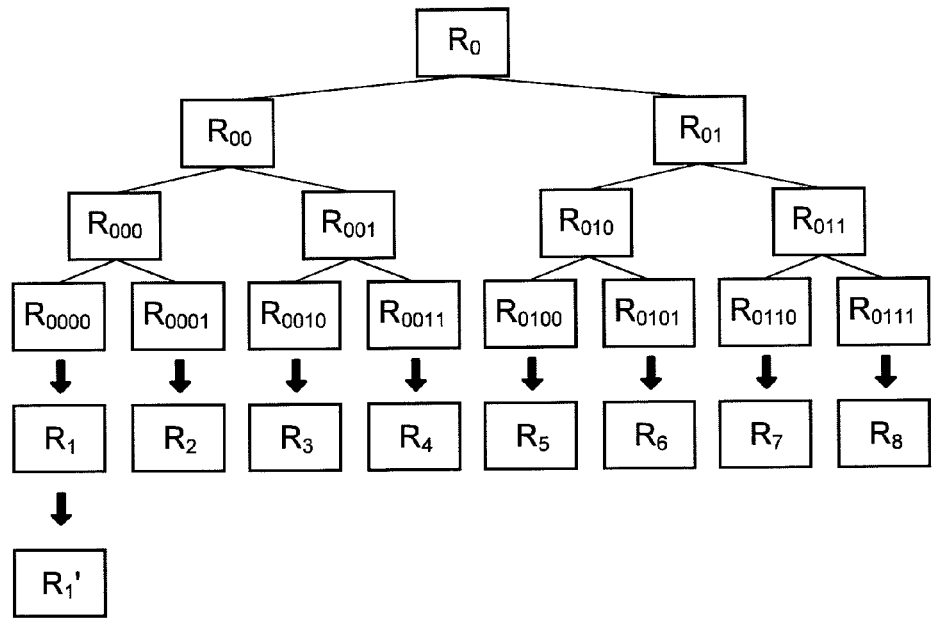
FIG. 19 is a schematic diagram for describing a procedure of generating random numbers.

FIG. 19 is a schematic diagram for describing a procedure of generating random numbers.

FIG. 19 illustrates, as an example, a case where the number of the content parts (components) m is 8 (the number of random numbers is also 8), however, the number of the parts may be arbitrary.

Also, the random number generator RNG includes a random number generator for generating random numbers twice as long as an input length.

Further, an output with respect to the input of $R_b$ is illustrated as $R_{b0} \| R_{b1} \leftarrow RNG(R_b)$. In this case, $R_L \| R_R$ indicates the concatenation of $R_L$ and $R_R$, and b indicates a character string of arbitrary length including 0 and 1 (hereinafter the same) "b0" and "b1" each indicate a character string b to which a character "0" or a character "1" is connected, respectively.

On the above-mentioned precondition, the updating part 219 generates $R_{00}$ and $R_{11}$ from $R_0$ by using the random number generator RNG.

Next, the updating part 219 generates $R_{001}, R_{001}$ and $R_{011}$, $R_{011}$ from $R_{00}$ and $R_{11}$.

Further, the updating part 219 repeatedly applies the random number generator RNG along a tree structure (binary tree), to thereby finally generate $R_{0000}$ to $R_{0111}$. By following the above-mentioned procedure, the encryption key creation random numbers, the number of which is m, are generated from the random number seed value $R_0$.

For example, in a case where a key of a certain user capable of viewing a first block has leaked out, it is necessary to update only the encryption key creation random number $R_1$ to $R_1'$.

In other words, in a case of employing the random number generation using the tree structure as shown in FIG. 19, if $R_{01}$, $R_{001}$, and $R_{0001}$ are disclosed in place of $R_0$, the encryption key creation random numbers from $R_2$ to $R_8$ can all be generated, but $R_1$ cannot be generated. Therefore, four random numbers of $R_{01}$, $R_{001}$, $R_{0000}'$, and $R_{0001}$ may be attached, in place of the random number seed value $R_0$, to the header 161 of the re-encrypted encrypted content C'.

According to the simple method illustrated in FIG. 18, it is necessary to attach all the regenerated numbers of $R1', \ldots, R8'$ (eight numbers) to the header 161 of the re-encrypted encrypted content C'. On the other hand, according to the random number generation method in FIG. 19, it is only necessary to attach $R_{01}$, $R_{001}$, $R_{0000}'$, and $R_{0001}$ (four numbers) to the header 161 of the re-encrypted encrypted content C', which makes it possible to reduce the data size of the additional information to be generated due to the re-encryption.

In the above-mentioned embodiments, as shown in FIG. 1, the key managing device 110, the key storing device 120, and the content storing device 130 are each used to create a key, store a key, and store encrypted content. However, the present invention is not limited thereto. In view of dispersing and centralizing the process, the processes performed in those devices may be dispersed or centralized.

Figure 20:
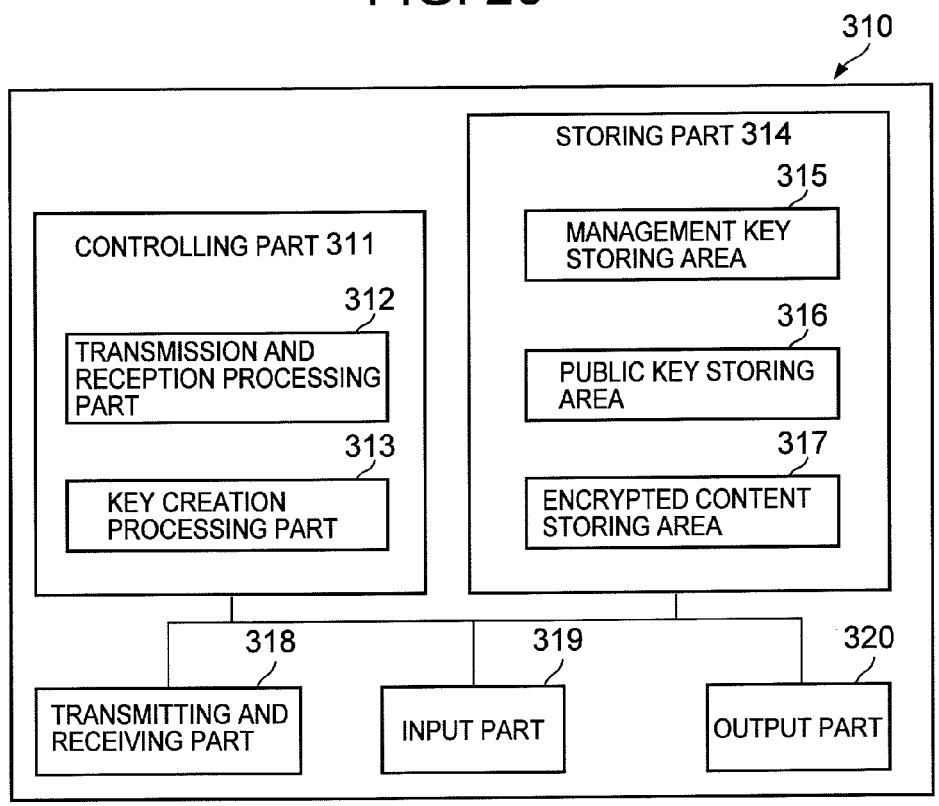
FIG. 20 is a schematic diagram of a management server.

For example, a key may be created and stored, and encrypted content may be managed by a single device such as a management server 310 as shown in FIG. 20 (schematic diagram of a management server), which includes a controlling part 311, a storing part 314, a transmitting and receiving part 318, an input part 319, and an output part 320.

In the management server 310, a transmission and reception processing part 312 of the controlling part 311 performs a process similar to the process performed by the transmission and reception processing parts 112, 122, and 132 in the key managing device 110, the key storing device 120, and the content storing device 130. A key creation processing part 313 of the management server 310 performs a process similar to the process performed by the key creation processing part 113 of the key managing device 110.

However, since the management server 310 performs the processes which are otherwise performed by the key managing device 110, the key storing device 120, and the content storing device 130, the transmission and reception processing part 312 of the management server 310 does not have to perform data communications between the key managing device 110, the key storing device 120, and the content storing device 130.

Also, a management key storing area 315 of the storing part 314 in the management server 310 stores information similar to the information stored in the management key storing area 115 of the storing part 114 of the key managing device 110.

Further, a public key storing area 316 of the storing part 314 in the management server 310 stores information similar to the information stored in the public key storing area 124 of the storing part 123 in the key storing device 120.

In addition, an encrypted content storing area 317 of the storing part 314 in the management server 310 stores information similar to the information stored in the encrypted content storing area 134 of the storing part 133 in the content storing device 130.

The transmitting and receiving part 318, the input part 319, and the output part 320 may be configured similarly to the transmitting and receiving part 116, the input part 117, and the output part 118 in the key managing device 110 of the first embodiment.

In the above-mentioned embodiments, the key managing device 110, the key storing device 120, the content storing device 130, and the user devices 140A to 140C are connected to one another through the network 160. However, the present invention is not limited thereto. For example, information to be exchanged between those devices may be stored in an external storage medium such as a USB memory and the external storage medium may be sent by mail to each of the devices so that the each of the devices can read out the information therefrom.

Also, in the above-mentioned embodiments, the number of the user devices 140A to 140C is three, but the number can be arbitrarily changed.

As regards a public key stored in the key storing device 120, it is desirable to issue a certificate with respect to the public key by the key managing device 110 in order to prevent the public key itself from being falsified. In the case of issuing a public key certificate as described above in the key managing device 110, it is necessary to provide the key managing device 110 with a certificate issuance processing part for issuing a certificate and a signing key storing area for storing a signing key to be used for issuing the certificate.

Also, according to the embodiments, the public key storing area 150 is provided to the storing part 146 of each of the user devices 140A to 140C, and a public key corresponding to the list $L_i$ is obtained from the public key storing area 150. However, the present invention is not limited thereto, and the list $L_i$ may be transmitted to the key storing device 120 and a public key corresponding to the list $L_i$ may be obtained from the key storing device 120.

Further, according to the above-mentioned embodiments, the encryption processing part 144 and the decryption processing part 145 of each of the user devices 140A to 140C can generate the same encryption key creation random numbers from the same random number seed value $R_0$, and the same encryption key creation random numbers as the encryption key creation random numbers used for creating (encrypting) the encrypted parts $C_1 \ldots, C_m$ can be allocated when decrypting the encrypted parts $C_1, \ldots, C_m$ (which includes, for example, a case where parts $M_1, \ldots, M_m$ and encrypted parts $C_1, C_m$ which are obtained by encrypting the parts $M_1, \ldots, M_m$ are arranged in the same order, and the encryption processing part 144 and the decryption processing part 145 generate the encryption key creation random numbers in the same order). However, the present invention is not limited to thereto, and even in a case where the encryption processing part 144 and the decryption processing part 145 cannot generate the same encryption key creation random numbers from the same random number seed value $R_0$ and in a case where the same encryption key creation random numbers as the encryption key creation random numbers used for creating (encrypting) the encrypted parts $C_1, \ldots, C_m$ cannot be allocated when decrypting the encrypted parts $C_1, \ldots, C_m$, a process similar to that of the present invention can be performed by specifying the encryption key creation random numbers used for creating the encrypted parts $C_1, \ldots, C_m$ for each of the encrypted parts $C_1, \ldots, C_m$ in the header.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. An encrypting device which encrypts content data, comprising:
a storing part which stores:
a secret key of a first user, which is obtained by:
calculating a product n by multiplication of two different prime numbers p and q;
specifying a positive integer s which is smaller than the product n;
specifying, with respect to the product n, an arbitrary prime number r which is smaller than a number of positive integers from 1 to n which are coprime to the product n; and
raising the positive integer s to the power of the prime number r and calculating a remainder by using the product n;
first public key information in which identification information for identifying each of the first user and a plurality of second users is associated with public keys of the first user and the plurality of second users, where the public key of the first user is the prime number r; the public key of each of the second user is alternatively selected, with respect to the product n, from prime numbers r' different from the prime number r, the prime numbers r' each being smaller than a number of positive integers from 1 to n which are coprime to the product n, and both public keys are identified by the identification information, and
a coefficient, which is the product n, shared by the secret key and the public keys; and
a controlling part,
wherein the controlling part performs:
an encryption target part specifying process of specifying, from among components which constitute the content data, at least one or more of the components as encryption target parts;
a random number generating process of generating random numbers each corresponding to each of the encryption target parts;
a user specifying process of creating, for each of the encryption target parts, user list information which specifies identification information for identifying, from among the plurality of second users, second users who are allowed to view the encryption target parts;
an encryption key creation key creating process of creating an encryption key creation key, for each of the encryption target parts, by reading out a public key corresponding to the identification information for identifying each of the second users, from the first public key information, the identification information being specified in the user specifying process, raising the secret key of the first user to the power of the public key thus read out, and calculating a remainder by using the coefficient;
an encryption key creating process of creating an encryption key for each of the encryption target parts by encrypting the random numbers each corresponding to each of the encryption target parts, by using the encryption key creation key;
an encrypting process of creating, for each of the encryption target parts, an encrypted part obtained by encrypting a corresponding one of the encryption target parts by using the encryption key created in the encryption key creating process; and
an encrypted content creating process of creating encrypted content which includes the encrypted parts, position information which specifies positions of the encryption target parts corresponding to the encrypted parts in the content data, the identification information for identifying the first user, the user list information for each of the encrypted parts, and information which specifies a random number for each of the encrypted parts.

2. An encrypting device according to claim 1, wherein:
the random number generating process further includes a process of creating a random number seed value, creating at least one or more random numbers from the random number seed value, and associating each of the random numbers with each of the encryption target parts; and
the information which specifies a random number for each of the encrypted parts in the encrypted content creating process includes the random number seed value.

3. An encrypting device according to claim 1, wherein:
the user list information created in the user specifying process includes, for each of the encryption target parts, identification information for identifying the second users who are allowed to view the encryption target parts and the identification information for identifying the first user; and
the encrypted content created in the encrypted content creating process includes the encrypted parts, the user list information for each of the encrypted parts, and the information which specifies a random number for each of the encrypted parts.

4. An encrypting device according to claim 1, wherein the encryption key creation key creating process further includes a process of reading out, for each of the encryption target parts, the public key corresponding to the identification information of the second users specified in the user specifying process, from the first public key information, raising the secret key of the first user to the power of the public key thus read out, and creating an encryption key creation key by using a hash value obtained from the remainder calculated by using the coefficient.

5. An encrypting device according to claim 1, wherein:
the storing part further stores an updated public key of a third user included in the plurality of second users;
the controlling part further performs:
an information obtaining process of obtaining, from the encrypted content, the encrypted parts, the identification information for identifying the first user, the user list information for each of the encrypted parts, and information which specifies a random number for each of the encrypted parts;
an encryption key creation key creating process of creating an encryption key creation key, for each of the encrypted parts obtained in the information obtaining process, by reading out the public key of each of the second users included in the user list information, raising the secret key of the first user to the power of the public key thus read out, and calculating a remainder by using the coefficient;
an encryption key creating process of creating, for each of the encrypted parts, an encryption key by encrypting random numbers each corresponding to each of the encrypted parts by using the encryption key creation key;
an updated encryption key creation key creating process of creating an updated encryption key creation key, for each of the encrypted parts obtained in the information obtaining process, by reading out the public key of each of the second users except the third user, the second users being included in the user list information for each of the encrypted parts, and the updated public key of the third user, from the storing part, raising the secret key of the first user to the power of the public key and the updated public key thus read out, and calculating a remainder by using the coefficient;

an updated random number generating process of generating an updated random number corresponding to each of the encrypted parts by decrypting the encryption key created in the encryption key creating process by using the updated encryption key creation key; and an updated encrypted content creating process of creating updated encrypted content which includes the encrypted parts, the position information which specifies positions of the encryption target parts corresponding to the encrypted parts in the content data, the identification information for identifying the first user, the user list information for each of the encrypted parts, and information which specifies an updated random number for each of the encrypted parts.

6. A decrypting device which decrypts the encrypted content created by the encrypting device according to claim 1, comprising:

a storing part which stores a secret key of one of the plurality of second users, which is obtained by raising the positive integer s to the power of a prime number r' among public keys corresponding to the one of the plurality of the second users and calculating a remainder by using the coefficient n, second public key information in which identification information for identifying each of the first user and the plurality of second users is associated with public keys of the first user and the plurality of second users, where the public key of the first user is the prime number r, the public keys of the second users are the prime numbers r', and both public keys are identified by the identification information and the coefficient n shared by the secret key and the public keys; and a controlling part, wherein the controlling part performs:

an information obtaining process of obtaining, from the encrypted content, the encrypted parts, the identification information of the first user, user list information for each of the encrypted parts, and information which specifies a random number for each of the encrypted parts;

a judging process of judging, for each of the encrypted parts obtained in the information obtaining process, whether or not the user list information for each of the encrypted parts includes the identification information for identifying the one of the plurality of second users;

an encryption key creation key creating process of creating an encryption key creation key, in a case where it has been judged in the judging process that the user list information for each of the encrypted parts includes the identification information for identifying the one of the plurality of second users, by reading out the public keys of the second users included in the user list information except the public key of the one of the plurality of second users, and the public key of the first user, raising the secret key of the one of the plurality of second users to the power of the public keys thus read out, and calculating a remainder by using the coefficient;

an encryption key crating process of creating, for each of the encrypted parts, an encryption key by encrypting the random numbers each corresponding to each of the encrypted parts, by using the encryption key creation key; and a decrypting process of decrypting, by using the encryption key created for each of the encrypted parts in the encryption key creating process, each of the encrypted parts corresponding to the encryption key, and arranging the encrypted parts thus decrypted at corresponding positions of the encryption target parts in the content data, the positions being specified by the position information.

7. A decrypting device according to claim 6, wherein:

the storing part further stores an updated public key of a third user included in the plurality of second users; and the controlling part further performs:

an information obtaining process of obtaining, from the encrypted content, the encrypted parts, the identification information for identifying the first user, the user list information for each of the encrypted parts, and information which specifies a random number for each of the encrypted parts;

an updated encryption key creation key creating process of creating an updated encryption key creation key by reading out, for each of the encrypted parts obtained in the information obtaining process, the public keys of the second users except the public key of the one of the plurality of second users and the public key of the third user, the second users being included in the user list information for each of the encrypted parts, the updated public key of the third user, and the public key of the first user, from the storing part, raising the secret key of the one of the plurality of second users to the power of the public keys and the updated public key thus read out, and calculating a remainder by using the coefficient;

an updated random number generating process of generating updated random numbers each corresponding to each of the encrypted parts, by decrypting the encryption key created in the encryption key creating process by using the updated encryption key creation key; and an updated encrypted content creating process of creating updated encrypted content which includes the encrypted parts, the position information which specifies positions of the encryption target parts corresponding to the encrypted parts in the content data, the user list information for each of the encrypted parts, and information which specifies an updated random number for each of the encrypted parts.

8. An information system, comprising:

an encrypting device which encrypts content data; and a key managing device which creates a secret key and a public key to be used by the encrypting device, wherein:

the key managing device includes a calculating part;

the calculating part of the key managing device performs:

a process of creating a public key of a first user by calculating a coefficient n by multiplication of two different prime numbers p and q, specifying an integer s which is smaller than the coefficient n, and specifying, with respect to the coefficient n, an arbitrary prime number r which is smaller than a number of positive integers from 1 to n which are coprime to the coefficient n;

a process of calculating a secret key of the first user by raising the integer s to the power of the prime number r and calculating a remainder by using the coefficient n; and a process of creating a public key for each of a plurality of second users by alternatively selecting, with respect to the coefficient n, a prime number from among prime numbers r' different from the prime number r, the prime numbers r' each being smaller than a number of positive integers from 1 to n which are coprime to the coefficient n;

the encrypting device comprises:

a storing part which stores a secret key of the first user, first public key information in which identification information for identifying each of the first user and a plurality of second users is associated with public keys of the first user and the plurality of second users identified by the identification information, and the coefficient n; and a controlling part;

the controlling part of the encrypting device performs:

an encryption target part specifying process of specifying, from among components which constitute the content data, at least one or more of components as encryption target parts;

a random number generating process of generating random numbers each corresponding to each of the encryption target parts;

a user specifying process of creating, for each of the encryption target parts, user list information which specifies identification information for identifying, from among the plurality of second users, second users who are allowed to view the encryption target parts;

an encryption key creation key creating process of creating an encryption key creation key, for each of the encryption target parts, by reading out a public key corresponding to the identification information for identifying each of the second users, from the first public key information, the identification information being specified in the user specifying process, raising the secret key of the first user to the power of the public key thus read out, and calculating a remainder by using the coefficient n;

an encryption key creating process of creating an encryption key for each of the encryption target parts by encrypting the random numbers each corresponding to each of the encryption target parts, by using the encryption key creation key; and a decrypting process of decrypting, by using the encryption key created for each of the encrypted parts in the encryption key creating process, each of the encrypted parts corresponding to the encryption key, and arranging the encrypted parts thus decrypted at corresponding positions of the encryption target parts in the content data, the positions being specified by the position information.

9. An information system according to claim 8, wherein:

the key managing device further comprises:

a storing part which stores the integer s, the coefficient n, and second public key information in which identification information for identifying each of the first user and the plurality of second users is associated with public keys of the first user and the plurality of second users identified by the identification information; and a controlling part;

the controlling part of the key managing device performs:

a public key updating process of updating a public key of a third user included in the plurality of the second users included in the second public key information by selecting, with respect to the coefficient n, the public key of the third user from among prime numbers r" different from the prime number r and the prime numbers r', the prime numbers r" each being smaller than a number of positive integers from 1 to n which are coprime to the coefficient n;

an information obtaining process of obtaining, from the encrypted content, the encrypted parts, the identification information for identifying the first user, the user list information for each of the encrypted parts, and the information which specifies a random number for each of the encrypted parts;

an updated encryption key creation key creating process of creating an updated encryption key creation key by reading, for each of the encrypted parts obtained in the information obtaining process, the public keys of the second users and the public key of the first user included in the user list information for the each of the encrypted parts, from the second public key information which has been updated in the public key updating process, raising the integer s to the power of the public keys thus read out, and calculating a remainder by using the coefficient n;

an updated random number generating process of generating updated random numbers each corresponding to each of the encrypted parts by decrypting the encryption key created in the encryption key creating process by the updated encryption key creating key; and an updated encrypted content creating process of creating updated encrypted content which includes the encrypted parts, the position information which specifies positions of the encryption target parts corresponding to the encrypted parts in the content data, the identification information for identifying the first user, the user list information for each of the encrypted parts, and the information which specifies an updated random number for each of the encrypted parts.

10. An encrypting method of encrypting content data which is performed by an encrypting device including:

a storing part which stores:

a secret key of a first user, which is obtained by:

calculating a product n by multiplication of two different prime numbers p and q;

specifying a positive integer s which is smaller than the product n;

specifying, with respect to the product n, an arbitrary prime number r which is smaller than a number of positive integers from 1 to n which are coprime to the product n; and raising the positive integer s to the power of the prime number r and calculating a remainder by using the product n;

first public key information in which identification information for identifying each of the first user and a plurality of second users is associated with public keys of the first user and the plurality of second users, where the public key of the first user is the prime number r; the public key of each of the second users is alternatively selected, with respect to the product n, from prime numbers r' different from the prime number r, the prime numbers r' each being smaller than a number of positive integers from 1 to n which are coprime to the product n, and both public keys are identified by the identification information, and a coefficient, which is the product n, shared by the secret key and the public keys; and a controlling part, the encrypting method comprising:

an encryption target part specifying step of specifying, by the controlling part, from among components which constitute the content data, at least one or more of the components as encryption target parts;

a random number generating step of generating, by the controlling part, random numbers each corresponding to each of the encryption target parts;

a user specifying step of creating, by the controlling part, for each of the encryption target parts, user list information which specifies identification information for identifying, from among the plurality of second users, second users who are allowed to view the encryption target parts;

an encryption key creation key creating step of creating an encryption key creation key by reading out, for each of the encryption target parts, a public key corresponding to the identification information of each of the second users specified in the user specifying step, from the first public key information, raising the secret key of the first user to the power of the public key thus read out, and calculating a remainder by using the coefficient, by the controlling part;

an encryption key creating step of creating, by the controlling part, an encryption key for each of the encryption target parts by encrypting the random numbers each corresponding to each of the encryption target parts by using the encryption key creation key;

an encrypting step of creating, by the controlling part, an encrypted part by encrypting, by using the encryption key created for each of the encryption target parts in the encryption key creating step, each of the encryption target parts corresponding to the encryption key; and an encrypted content creating step of creating, by the controlling part, encrypted content which includes the encrypted parts, position information which specifies positions of the encryption target parts corresponding to the encrypted parts in the content data, the identification information of the first user, the user list information for each of the encrypted parts, and the information which specifies a random number for each of the encrypted parts.

11. A decrypting method of decrypting the encrypted content created by the encrypting method according to claim 10, which is performed by a decrypting device including:

a storing part which stores a secret key of one of the plurality of the second users, which is obtained by raising the positive integer s to the power of a prime number r′ among public keys corresponding to the one of the plurality of the second users and calculating a remainder by using the coefficient n, second public key information in which identification information for identifying each of the first user and the plurality of second users is associated with public keys of the first user and the plurality of second users where the public key of the first user is the prime number r, the public keys of the second users are the prime numbers r′, and both public keys are identified by the identification information and the coefficient n shared by the secret key and the public keys; and a controlling part, the decrypting method comprising:

an information obtaining step of obtaining, by the controlling part, from the encrypted content, the encrypted parts, the identification information for identifying the first user, the user list information for each of the encrypted parts, and information which specifies a random number for each of the encrypted parts;

a judging step of judging, by the controlling part, for each of the encrypted parts obtained in the information obtaining step, whether or not the user list information for each of the encrypted parts includes the identification information for identifying the one of the plurality of second users;

an encryption key creation key creating step of creating, in a case where it has been judged in the judging step that the user list information for each of the encrypted parts includes the identification information for identifying the one of the plurality of second users, an encryption key creation key by reading out the public key of the second users included in the user list information, the public keys of the plurality of second users included in the user list information except the public key of the one of the plurality of second users, and the public key of the first user, raising a secret key of the one of the plurality of second users to the power of the public keys thus read out, and calculating a remainder by using the coefficient, by the controlling part;

an encryption key creating step of creating, by the controlling part, an encryption key for each of the encrypted parts, by encrypting the random numbers each corresponding to each of the encrypted parts by using the encryption key creation key; and a decrypting step of decrypting, by using the encryption key created for each of the encrypted parts in the encryption key creating step, each of the encrypted parts corresponding to the encryption key, and arranging the encrypted parts thus decrypted at positions of the encryption target parts in the content data, the positions being specified by the position information, by the controlling part.

12. A non-transitory computer-readable medium having a program embedded therein, where the program causes a computer to function as:

a storing means which stores:

a secret key of a first user, which is obtained by:

calculating a product n by multiplication of two different prime numbers p and q:

specifying a positive integer s which is smaller than the product n;

specifying, with respect to the product n, an arbitrary prime number r which is smaller than a number of positive integers from 1 to n which are coprime to the product n; and raising the positive integer s to the power of the prime number r and calculating a remainder by using the product n;

first public key information in which identification information for identifying each of the first user and a plurality of second users is associated with public keys of the first user and the plurality of second users, where the public key of the first user is the prime number r; the public key of each of the second users is alternatively selected, with respect to the product n, from prime numbers r′ different from the prime number r, each being smaller than a number of positive integers from 1 to n which are coprime to the product n, and both public keys are identified by the identification information, and a coefficient, which is the product n, shared by the secret key and the public keys; and a controlling means, the program causing the controlling means to perform:

an encryption target part specifying process of specifying, from among components which constitute the content data, at least one or more of the components as encryption target parts;

a random number generating process of generating random numbers each corresponding to each of the encryption target parts;

a user specifying process of creating, for each of the encryption target parts, user list information which specifies identification information for identifying, from among the plurality of second users, second users who are allowed to view the encryption target parts;

an encryption key creation key creating process of creating an encryption key creation key by reading out, for each of the encryption target parts, a public key corresponding to the identification information of each of the second users specified in the user specifying process, from the first public key information, raising the secret key of the first user to the power of the public key thus read out, and calculating a remainder by using the coefficient;

an encryption key creating process of creating an encryption key for each of the encryption target parts by encrypting the random numbers each corresponding to each of the encryption target parts by using the encryption key creation key;

an encrypting process of creating an encrypted part by encrypting, by using the encryption key created for each of the encryption target parts in the encryption key creating process, each of the encryption target parts corresponding to the encryption key; and an encrypted content creating process of creating encrypted content which includes the encrypted parts, position information which specifies positions of the encryption target parts corresponding to the encrypted parts in the content data, the identification information of the first user, the user list information for each of the encrypted parts, and the information which specifies a random number for each of the encrypted parts.

13. A non-transitory computer-readable medium having a program embedded therein, where the program causes a computer to function as:

a storing means which stores a secret key of one of the plurality of second users, which is obtained by raising the positive integer s to the power of a prime number r' among public keys corresponding to the one of the plurality of the second users and calculating a remainder by using the coefficient n, second public key information in which identification information for identifying each of the first user and the plurality of second users is associated with public keys of the first user and the plurality of second users where the public key of the first user is the prime number r, the public keys of the second users are the prime numbers r', and both public keys are identified by the identification information and the coefficient n shared by the secret key and the public keys; and a controlling means, for decrypting encrypted content created by a computer in which the program according to claim 12 is loaded, the program causing the controlling means to perform:

an information obtaining process of obtaining, from the encrypted content, the encrypted parts, the identification information of the first user, the user list information for each of the encrypted parts, and the information for identifying a random number for each of the encrypted parts;

a judging process of judging, for each of the encrypted parts obtained in the information obtaining process, whether or not the user list information for each of the encrypted parts includes identification information of the one of the plurality of second users;

an encryption key creation key creating process of creating, in a case where it has been judged in the judging process that the user list information for each of the encrypted parts includes the identification information of the one of the plurality of second users, an encryption key creation key by reading out public keys of the second users included in the user list information except the public key of the one of the plurality of second users, and the public key of the first user, raising the secret key of the one of the plurality of second users to the power of the public keys thus read out, and calculating a remainder by using the coefficient;

an encryption key creating process of creating an encryption key for each of the encrypted parts, by encrypting the random numbers each corresponding to each of the encrypted parts by using the encryption key creation key; and a decrypting process of decrypting, by using the encryption key created for each of the encrypted parts in the encryption key creating process, each of the encrypted parts corresponding to the encryption key, and arranging the encrypted parts thus decrypted at corresponding positions of the encryption target parts in the content data, the positions being specified by the position information.

* * * * *